(12) United States Patent
Metzler et al.

(10) Patent No.: US 11,804,312 B2
(45) Date of Patent: Oct. 31, 2023

(54) SYSTEM AND METHOD FOR GENERATING PHOTON EMISSION FROM ATOMIC NUCLEI

(71) Applicant: Florian Metzler, Cambridge, MA (US)

(72) Inventors: Florian Metzler, Cambridge, MA (US); Peter Hagelstein, Carlisle, MA (US)

(73) Assignee: CAMBRIDGE PHONON SYSTEMS, INC, Cambridge, MA (US)

( * ) Notice: Subject to any disclaimer, the term of this patent is extended or adjusted under 35 U.S.C. 154(b) by 758 days.

(21) Appl. No.: 16/617,957

(22) PCT Filed: Jun. 4, 2018

(86) PCT No.: PCT/US2018/035883
§ 371 (c)(1),
(2) Date: Nov. 27, 2019

(87) PCT Pub. No.: WO2018/226597
PCT Pub. Date: Dec. 13, 2018

(65) Prior Publication Data
US 2020/0234838 A1  Jul. 23, 2020

Related U.S. Application Data

(60) Provisional application No. 62/675,755, filed on May 23, 2018, provisional application No. 62/586,144, (Continued)

(51) Int. Cl.
*G21G 4/06* (2006.01)
(52) U.S. Cl.
CPC ...................................... *G21G 4/06* (2013.01)

(58) Field of Classification Search
CPC ... G21G 4/06; G21G 7/00; H05G 2/00; Y02E 30/10
See application file for complete search history.

(56) References Cited

U.S. PATENT DOCUMENTS 3,281,600 A  10/1966 Vali et al.
3,430,046 A  2/1969 Eerkens
(Continued)

FOREIGN PATENT DOCUMENTS

WO  WO2015/195171 A2  12/2015

OTHER PUBLICATIONS

Gruverman, Mössbauer Effect Methodology, Springer Science+Business Media, LLC 1965 (Year: 1965).*
(Continued)

*Primary Examiner* — David L Singer
(74) *Attorney, Agent, or Firm* — AKC PATENTS, LLC; Aliki K. Collins

(57) ABSTRACT

A system for generating photon emission from atomic nuclei includes a device for generating phonons and a condensed matter medium comprising atomic nuclei. The phonons interact with the atomic nuclei and affect nuclear states of some of the atomic nuclei by transferring energy to the nuclei and causing the nuclei to emit photons. The device for generating phonons is configured to apply stress to the condensed matter medium and comprises an elongated plate and first and second clamps attached to first and second ends of the elongated plate, respectively, and the first and second clamps are configured to apply stress onto the first and second ends of the elongated plate and to cause movement of dislocations within the elongated plate.

20 Claims, 26 Drawing Sheets

Related U.S. Application Data filed on Nov. 14, 2017, provisional application No. 62/515,393, filed on Jun. 5, 2017.

(56)  References Cited

U.S. PATENT DOCUMENTS

| | | | |
|---|---|---|---|
| 5,887,008 | A | 3/1999 | Ikegami |
| 2012/0234164 | A1 | 9/2012 | Kucherov et al. |
| 2015/0162104 | A1 | 6/2015 | Soininen |
| 2017/0173552 | A1* | 6/2017 | Hagelstein ............... G21H 1/00 |

OTHER PUBLICATIONS

Journal of Condensed Matter Nuclear Science, vol. 12, Dec. 2013, pertinent article Born-Oppenheimer and Fixed-point Models for Second-order Phonon Exchange in a Metal and pertinent article Phonon-nuclear Coupling for Anomalies in Condensed Matter Nuclear Science both by Hagelstein et al.(Year: 2013).*

Brent Fultz, "Mössbauer Spectrometry", in Characterization of Materials. Elton Kaufmann, Editor (John Wiley, New York, 2011). (Year: 2011).*

Cieszylkowska et al, Preparation Of 57Co Sources for Mössbauer Spectroscopy (Year: 2012).*

Metzler, Thesis: Experiments to Investigate Phonon-Nuclear Interactions, Department of Nuclear Science and Engineering at the Massachusetts Institute of Technology (Year: 2019).*

Ruello et al., Physical mechanisms of coherent acoustic phonons generation by ultrafast laser action Ultrasonics 56(2015) 21-35; p. 22-27.

Makovetskii, D.N., "Nonlinear Dynamics of the Phonon Stimulated Emission in Microwave Solid-State Resonator of the Nonautonomous Phaser Generator" Apr. 2, 2007.

PCT/US18/35883 ISR, Oct. 17, 2018.

* cited by examiner

301

302

300

300

Emission energy range dependent on substrate and plate materials; during operation Emission energy range dependent on plate materials; during operation

SYSTEM AND METHOD FOR GENERATING PHOTON EMISSION FROM ATOMIC NUCLEI

CROSS REFERENCE TO RELATED CO-PENDING APPLICATIONS

This application claims the benefit of PCT application Ser. No. PCT/US18/35883 filed Jun. 4, 2018 and entitled "System and method for generating photon emission from atomic nuclei", the contents of which are expressly incorporated herein by reference.

This application claims the benefit of U.S. provisional application Ser. No. 62/515,393 filed Jun. 5, 2017 and entitled "Probabilistic Models for Beam, Spot and Line Emission for Collimated X-ray Emission", the contents of which are expressly incorporated herein by reference.

This application claims the benefit of U.S. provisional application Ser. No. 62/516,604 —filed Jun. 7, 2017 and entitled "Probabilistic Models for Beam, Spot and Line Emission for Collimated X-ray Emission", the contents of which are expressly incorporated herein by reference.

This application claims the benefit of U.S. provisional application Ser. No. 62/586,144 filed Nov. 14, 2017 and entitled "Temperature Change Stimulation of Stress-Induced Nuclear Excitation", the contents of which are expressly incorporated herein by reference.

This application claims the benefit of U.S. provisional application Ser. No. 62/675,755 filed May 23, 2018 and entitled "Phonon-mediated nuclear excitation and de-excitation", the contents of which are expressly incorporated herein by reference.

FIELD OF THE INVENTION

The present invention relates to a system and method for generating photon emission from atomic nuclei and in particular to a system and method for generating photon emission from atomic nuclei via phonon-mediated excitation of nuclear states.

BACKGROUND OF THE INVENTION

Atomic nuclei can absorb energy which results in such nuclei being placed in excited states. For excitation of a nucleus to occur, energy can be coupled into the nucleus from outside the nucleus, or energy can originate from a nuclear reaction within the nucleus itself. Different nuclides exhibit different discrete energy levels, also known as nuclear states. These are the energy levels to which respective nuclei can be excited to or de-excited from, if matching energies can be transferred into and out of such nuclei. The energy levels that correspond to the possible excited states of a given nucleus are determined by its internal composition such as the number of neutrons and protons that the nucleus of a particular nuclide comprises. The energy levels of possible excited states of nuclei are also known as nuclear resonances of those nuclei. When a nucleus is in an excited state, it can turn to lower excited states or to an unexcited state which is also known as the ground state of the nucleus. The process of moving from higher excited states to lower excited states or to the ground state is known as de-excitation. In the course of de-excitation, energy of an amount corresponding to the difference between the original state and the resulting state transfers out of the nucleus.

Referring to FIG. 1, excitation and de-excitation of atomic nuclei typically takes place through the absorption or emission of energy via photons 102, 104, respectively, or absorption or emission of energetic particles 101, 103, respectively, such as neutrons or charged particles. While these approaches enable a wide range of nuclear engineering applications, there are disadvantages associated with them. For the excitation of atomic nuclei via photons or energetic particles, typically large and expensive capital equipment is needed such as particle accelerators that accelerate particles to desired energy levels through electromagnetic means. In turn, when energy gets transferred from excited nuclei to photons and energetic particles, the resulting radiation is often penetrating and hazardous to humans as well as difficult to harness and convert to more desirable forms of energy. Therefore, an alternative method for the excitation and de-excitation of atomic nuclei that can be employed in simpler, more economical, and safer ways would be useful.

SUMMARY OF THE INVENTION

In general in one aspect, the invention features a system for generating photon emission from atomic nuclei including a device for generating phonons and a condensed matter medium comprising atomic nuclei. The phonons interact with the atomic nuclei and affect nuclear states of some of the atomic nuclei by transferring energy to the nuclei and causing the nuclei to emit photons.

Implementations of this aspect of the invention may include one or more of the following features. The device for generating phonons generates phonons via stress-induced dislocation movement. The device for generating phonons is configured to apply stress to the condensed matter medium. The device for generating phonons is further configured to apply heat to the condensed matter medium. The device for generating phonons comprises an elongated plate and first and second clamps attached to first and second ends of the elongated plate, respectively, and wherein the first and second clamps are configured to apply stress onto the first and second ends of the elongated plate and to cause movement of dislocations within the elongated plate. The condensed matter medium comprises radioactive material. The condensed matter medium comprises a ring-shaped substrate of evaporated 57CoCl2 bonded to a center of the elongated plate (referred to as "substrate"). The ring-shaped substrate is further coated with epoxy. The elongated plate comprises steel having a dislocation density of $10^8/cm^2$ to $10^{16}/cm^2$. The first and second clamps apply compressional stress of about 2000 lbs onto the first and second ends of the elongated plate. Each clamp comprises first and second plates and the first and second plates cover a top surface corner and a bottom surface corner of the elongated plate so that each area of the elongated plate covered by the two plates forms an isosceles triangle. The generated photon emission is monoenergetic. The generated photon emission is anisotropic. The generated photon emission is collimated. The energy is transferred to the nuclei via up-conversion. The energy is transferred to the nuclei via excitation transfer. The energy is transferred to the nuclei via subdivision. The device for generating phonons comprises a laser. The device for generating phonons comprises a transducer. The elongated plate comprises one of metals, semiconductor materials, non-metallic materials, graphene, ceramics, or combinations thereof.

In general in another aspect the invention features a method for generating photon emission from atomic nuclei including the following. First, generating phonons, then providing a condensed matter medium comprising atomic nuclei and then interacting the phonons with the atomic nuclei and affecting nuclear states of some of the atomic nuclei by transferring energy to the nuclei and causing the nuclei to emit photons.

In general in another aspect the invention features a system for suppressing photon emission from atomic nuclei including a device for generating phonons and a condensed matter medium comprising atomic nuclei. The phonons interact with the atomic nuclei and affect nuclear states of some of the atomic nuclei by transferring energy away from the atomic nuclei and causing suppression of otherwise expected photon emission from the atomic nuclei.

In general in another aspect the invention features a system for generating photon emission from atomic nuclei at a specific location including a device for generating phonons and a condensed matter medium comprising a first group of atomic nuclei and a second group of atomic nuclei. The phonons interact with the first group of atomic nuclei and affect nuclear states of the first group of the atomic nuclei by transferring energy to the first group of atomic nuclei and causing the first group of atomic nuclei to emit photons at a first location. The phonons interact with the second group of atomic nuclei and affect nuclear states of the second group of atomic nuclei by transferring energy away from the second group of atomic nuclei causing suppression of otherwise expected photon emission from the second group of nuclei at a second location.

BRIEF DESCRIPTION OF THE DRAWINGS

Referring to the figures, wherein like numerals represent like parts throughout the several views.

DETAILED DESCRIPTION OF THE INVENTION

Figure 1:
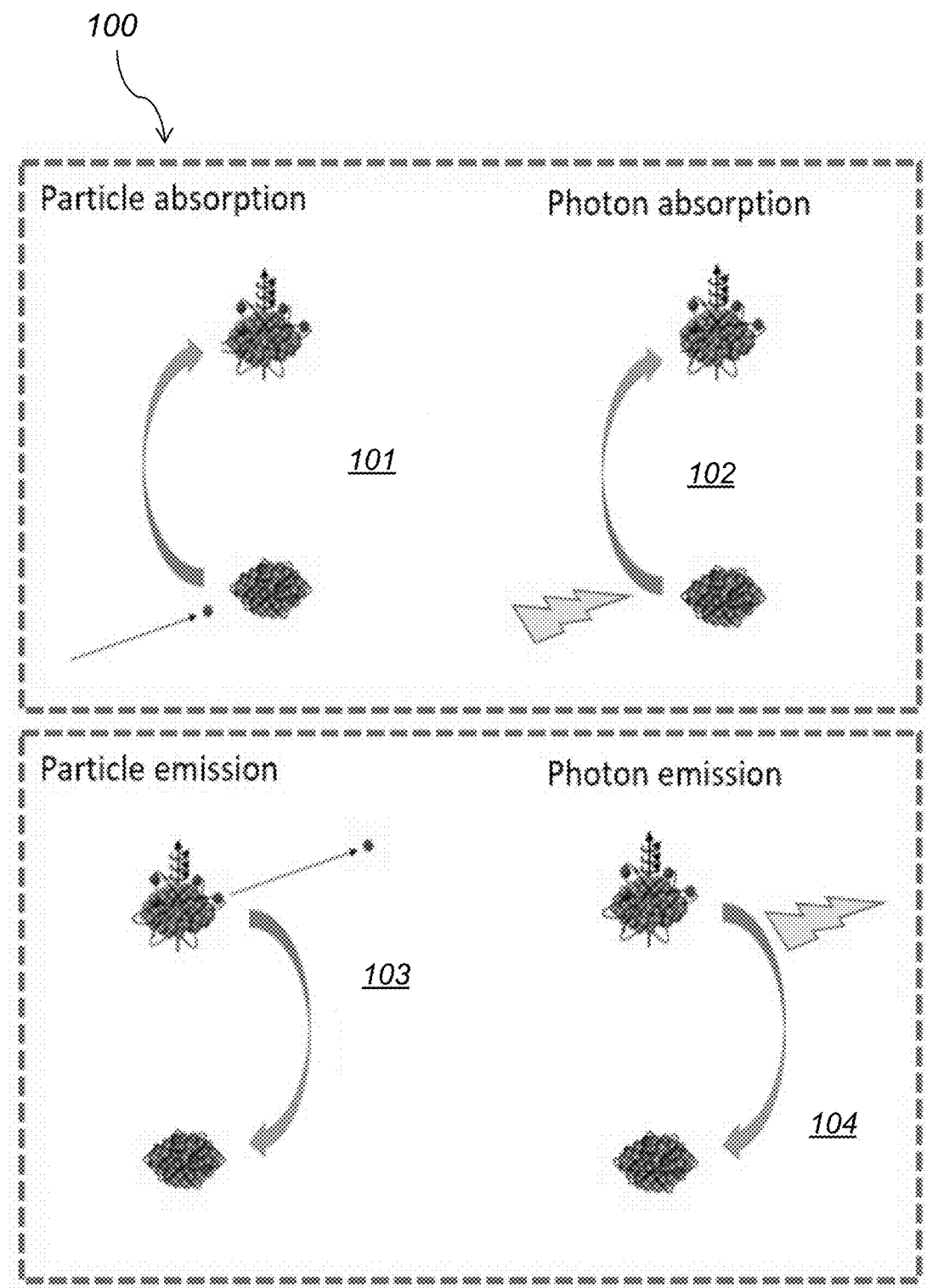
FIG. 1 illustrates processes of exciting and de-exciting atomic nuclei by transferring energy into and out of nuclear states, respectively, via energetic particles or photons.

The present invention relates to systems and methods of generating a useful radiation source, such as photon source, at specific energy levels and at specific angular orientation (e.g. collimated), by exciting atomic nuclei through phonon-mediated energy exchange. The present invention also relates to a system and a method of generating useful energy, such as heat, from radioactive sources and excited atomic nuclei. Specifically, the invention teaches novel ways of transferring energy into and out of excited nuclear states via phonon interactions.

The following paragraphs first introduce the underlying physical principles for phonon-mediated excitation and de-excitation of atomic nuclei, centered around phonon-nuclear coupling. Next, energy exchange mechanisms based on phonon-nuclear coupling are introduced briefly. Finally, macroscopic effects of such mechanisms in action and their observability, as exhibited by the disclosed method and apparatus, are introduced.

Phonon-Nuclear Coupling

A phonon is defined as a collective excitation of atoms in a periodic, elastic arrangement of atoms or molecules in condensed matter such as in an atomic lattice of solids. It can be viewed as a quantum of energy associated with a vibrational mode. A vibrational mode describes a particular spatial manifestation of the periodic motion of connected atoms.

Associated with an excited mode are a frequency, an amplitude, and a corresponding total energy of the excited mode. Quantum-mechanically, the total energy of the excited mode can be viewed as comprising phonons as quanta of energy. The term phonon mode is used to refer to such a mode. The phonon energy is proportional to the frequency of the phonon mode, which depends on the spatial configuration of atoms. The number of phonons in the excited phonon mode is the total energy of the excited phonon mode divided by the phonon energy. The total energy of the excited phonon mode (and therefore the number of phonons) is proportional to the square of the vibrational amplitude. The coupling between internal states of atomic nuclei and excited phonon modes in which such nuclei participate is described as phonon-nuclear coupling. Phonon-nuclear coupling can occur when atomic nuclei are part of a structure that vibrates e.g. when respective nuclei are bonded to the same lattice that sustains a common excited phonon mode. Nuclei are principal constituents of the lattice (or amorphic structure if order is lacking). If there are vibrations in the lattice, then the internal states of the vibrating nuclei can couple to the vibrations via phonon exchange.

When phonon-nuclear coupling manifests and in what ways, depends on a number of variables. In case of excitation, the energy difference between original and resulting nuclear states must be matched by a corresponding amount of energy in the form of a commensurate number of phonons, or nuclear excitation energy from other nuclei, or a combination thereof. Similarly, in case of de-excitation, the energy difference between original and resulting nuclear states must be absorbable by a commensurate number of phonons that the lattice can sustain, or by excitation of other atomic nuclei, or a combination thereof. The number of phonons that are present or that can be sustained in a particular condensed matter environment as well as the phonons' energy levels depend on the composition and arrangement of the atoms in the lattice, which determine the vibrational modes and frequencies, as well as the presence of different triggers that can cause the lattice to vibrate.

Figure 2:
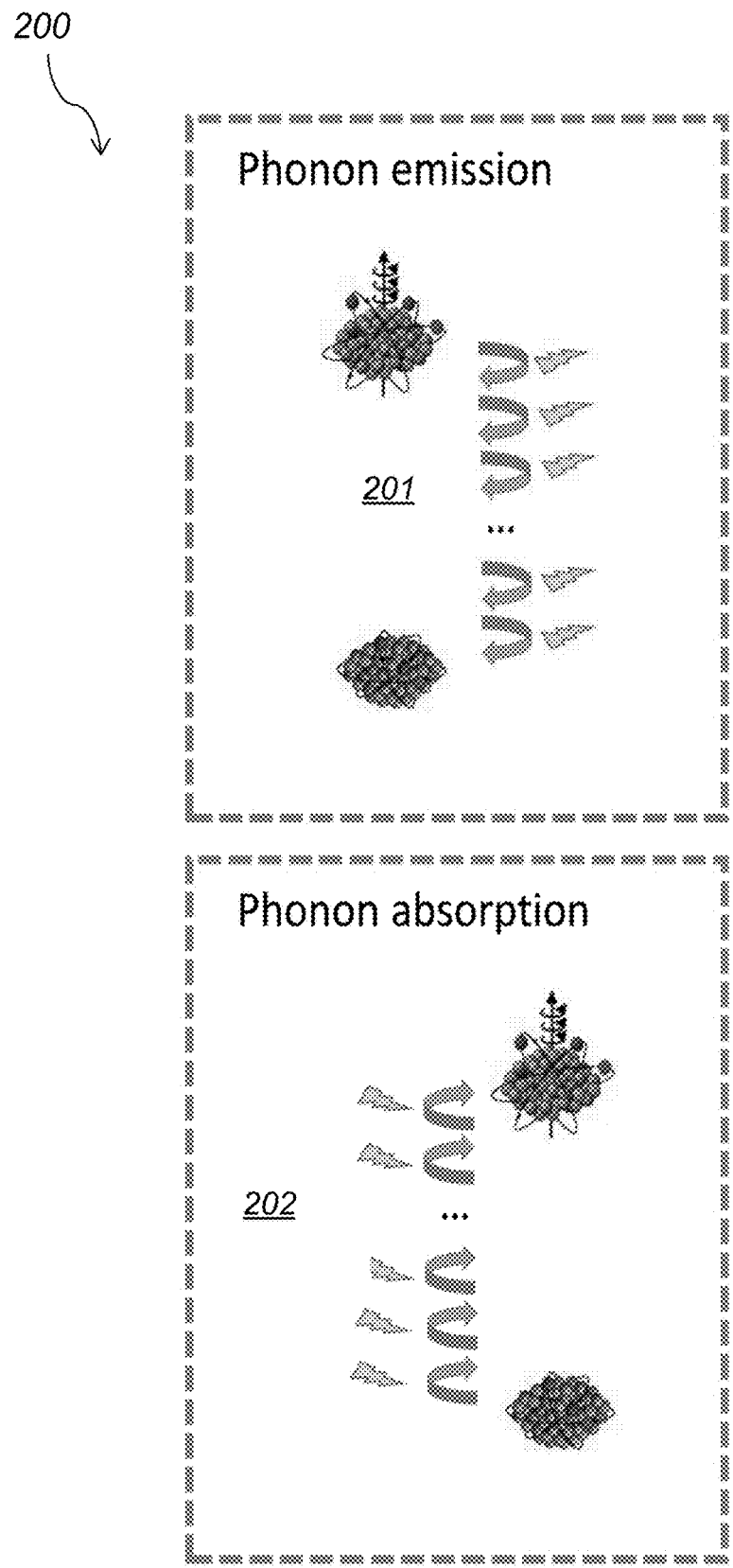
FIG. 2 depicts processes of exciting and de-exciting atomic nuclei by transferring energy into and out of nuclear states, respectively, via phonons, according to this invention.

FIG. 2 illustrates in a schematic way a mechanism for phonon-mediated excitation 201 and phonon-mediated de-excitation 202 of an atomic nucleus. Phonon-nuclear coupling can vary in strength depending on the system configuration which determines relevant variables such as phonon energies and phonon populations in the excited phonon modes, the types of excited phonon modes (bandhead modes and other spatially uniform or self-similar modes are preferred as they maximize the possibility of phonon-nuclear coupling based mechanisms to manifest) as well as the nuclides affected by the excited phonon modes, their arrangement, their energy levels, and their initial states. Other variables that determine the strength of phonon-nuclear coupling are the degree of phase uniformity across the vibrating atoms and the number of atoms participating in vibrations (large Dicke factor). For both of these variables, higher values lead to stronger phonon-nuclear coupling.

Depending on the strength of phonon-nuclear coupling in a given condensed matter environment, phonon-nuclear coupling can manifest through a number of different mechanisms and corresponding effects.

When the phonon-nuclear coupling strength for certain mechanisms to occur becomes high enough, macroscopic effects can be observed which are described below. First, however, the different energy exchange mechanisms are introduced.

Energy Exchange Mechanisms that Follow from Phonon-Nuclear Coupling

Phonon-nuclear coupling can manifest through a number of different mechanisms whose occurrences depend on the specific boundary conditions that shape the variables described above:

Excitation transfer: Energy transfers, mediated by a common excited phonon mode, from excited nuclei to other nuclei which are in lower excited states or in ground state. Receiver and donor nuclei both interact with the same phonon mode due to being bonded to the same vibrating lattice. The probability for this mechanism to occur is increased if energy levels of receiver and donor nuclei match. Excitation transfer can be resonant, manifesting as nuclear phase coherence of the thus excited nuclei which in turn can lead to anisotropic photon emission (if the nuclei themselves are arranged in an orderly manner such as in a lattice). In the presence of comparatively higher energies in excited phonon modes, excitation transfer can also be non-resonant, manifesting as a sequence of excitation transfers that can lead to observable delocalization effects. In such non-resonant excitation transfer, off-resonance states (also known as virtual states) are occupied more extensively than in resonant excitation transfer. During such off-resonance states, the phonon mode can temporarily accommodate some of the energy from nuclear states of nuclei that are involved in the transfer. If the energies of excited phonon modes are further increased in a given configuration, then—by the same principle—non-resonant excitation transfer can give way to up-conversion (or down-conversion if excitation is already present in the system), as the available phonon modes exchange energy with atomic nuclei.

Up-conversion: Up-conversion occurs via large numbers of sequential non-resonant excitation transfers: phonons transfer energy to atomic nuclei which are part of the vibrating lattice that sustains said phonons. Thus transferred energy leads to the excitation of atomic nuclei and to a commensurate reduction of energy in excited phonon modes. For this mechanism to occur, the available excited phonon modes need to have enough energy to excite energy-receiving nuclei from their original to their resulting states.

Down-conversion: Energy from excited atomic nuclei, which are part of a vibrating lattice that sustains phonons, transfers from the nuclei to said phonons. Thus transferred energy leads to de-excitation of atomic nuclei to a lower excited state or ground state and to a commensurate increase of the energy of the available phonon modes. For this mechanism to occur, the vibrating lattice needs to be able to sustain enough energy in excited phonon modes to absorb the energy difference between the original and resulting nuclear states of the de-exciting nuclei.

Subdivision: Energy transfers, mediated by common excited phonon modes, from excited nuclei to ground state nuclei with non-matching energy levels. If the energy quanta that potential receiver nuclei can accommodate based on their energy levels are below the energy quanta potentially available from the de-exciting donor nuclei, then the energy emitted from donor nuclei can be transferred to more than one receiving nuclei. To proceed as a quantum coherent process, any energy mismatch needs to be made up by (partial) up-conversion or down-conversion.

Conditions for the respective mechanisms to manifest depend on the strength of phonon-nuclear coupling which in turn results from the particular system configuration with respect to the variables discussed above. Key parameters are the energies in excited phonon modes and the configuration of nuclides in the lattice (the spatial distribution of nuclides and their respective energy levels/transition energies). Since both of these can vary across macroscopic samples (or can be engineered that way), in reality, often a superposition of multiple mechanisms can be observed in a given implementation, with exact ratios depending on respective boundary conditions. From a practitioner's perspective and with respect to industrial applications, those mechanisms that lead to observable effects in a given implementation are typically most relevant.

It is emphasized that excitation transfer as a generic principle is a prerequisite for all of the above listed mechanisms, and mechanisms such as up-conversion and down-conversion manifest as a result of a large number of non-resonant excitation transfers. In a given lattice configuration, the relative presence of each of the above mechanisms can be indicative of the particular excited phonon modes and their total energies in said lattice. Furthermore, in a given lattice configuration of nuclei, and when focusing on a given nuclear transition, the remaining key operational parameter that determines which mechanism manifests is the energy of the common excited phonon modes of the affected nuclei, which is often determined by the amplitude of vibrations. With phonon-nuclear coupling strength (in the above described lattice configuration: with increasing energy of excited phonon modes), mechanisms will manifest in the following order: resonant excitation transfer, non-resonant excitation transfer, up-conversion (or down-conversion/sub-division if nuclear excitation is already present). Therefore, in this text, mechanisms such as resonant excitation transfer are described as lower order mechanisms and mechanisms such as up-conversion are described as higher order mechanisms. Specifically: all else equal, lower order mechanisms such as excitation transfer require less energy in excited phonon modes in order to manifest compared to higher order mechanisms such as up-conversion. Characterizing effects that follow from excitation transfer is thus a suitable starting point for diagnosing and optimizing a condensed matter environment with respect to phonon-nuclear coupling strength.

Macroscopic Effects: Delocalization

Excitation transfer mechanisms lead to delocalization and angular anisotropy effects of corresponding radioactive emission—making those effects suitable observables of phonon-nuclear coupling based mechanisms in operation. What is meant by delocalization is a change in the spatial distribution of photon emission. Such an effect occurs because alongside the phonon-nuclear coupling based mechanisms of phonon-mediated excitation and de-excitation introduced above, conventional de-excitation via photon emission (radiative decay) remains a distinct possibility with a nonzero probability for excited nuclei. This is useful because photons can be easily and reliably detected; and because such photons can be used in applications. If de-excitation of the excited state of a nucleus via photon emission occurs after that nucleus itself had earlier been excited via phonon-mediated energy exchange (e.g. excitation transfer, up-conversion, or subdivision), then the location of the emission of the photon resulting from the de-excitation is different from where it would have been emitted in the absence of phonon-mediated energy exchange. In other words, under the presence of one or more common excited phonon modes, photon emission occurs from locations that do not otherwise contain excited or radioactive nuclei. Similarly, under the presence of one or more common excited phonon modes, an absence of photon emission occurs from locations that do contain excited or radioactive nuclei. Whether or not such delocalization is macroscopically observable depends on the distance that excitation transfers this way (including through repeated transfers). The distance of excitation transfer increases, and therefore its macroscopically observability, when excitation transfer is non-resonant, i.e. under conditions when—all else equal—the energies of excited phonon modes are comparably higher, or the affected nuclear state energies are comparatively lower. In a given configuration of atomic nuclei which exhibit non-resonant excitation transfer, the up-conversion regime can be entered by increasing the available energies in excited phonon modes e.g. through exciting available phonon modes at higher frequencies or increasing the amplitudes of the vibrations (increasing the phonon population).

Figure 11:
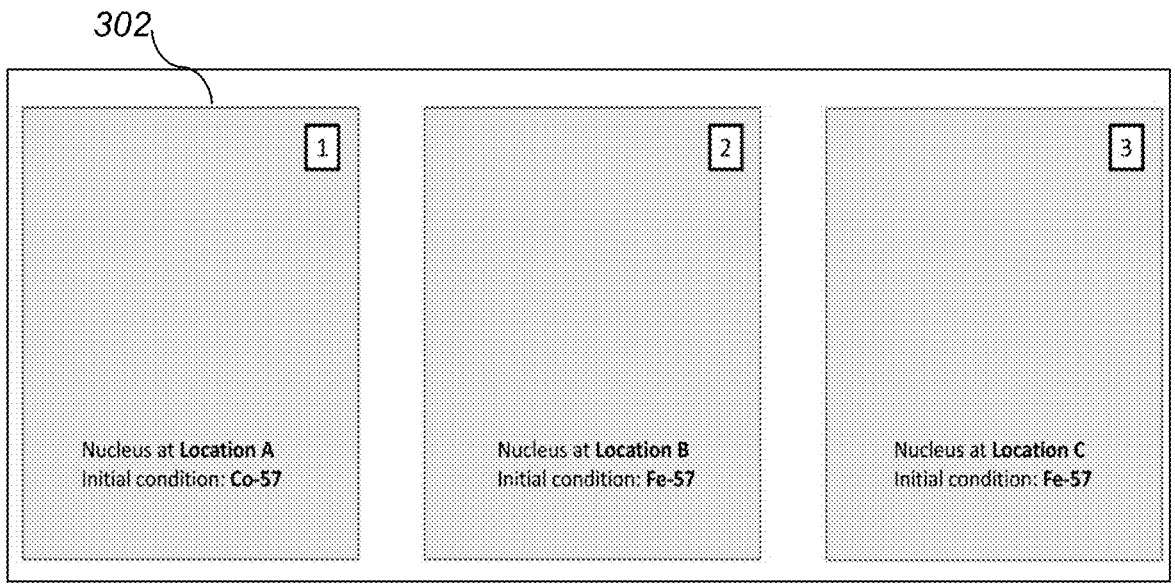
FIG. 11 depicts different nuclei, such as Co-57 and Fe-57, occupying different locations A, B, C in the substrate.
Figure 12:
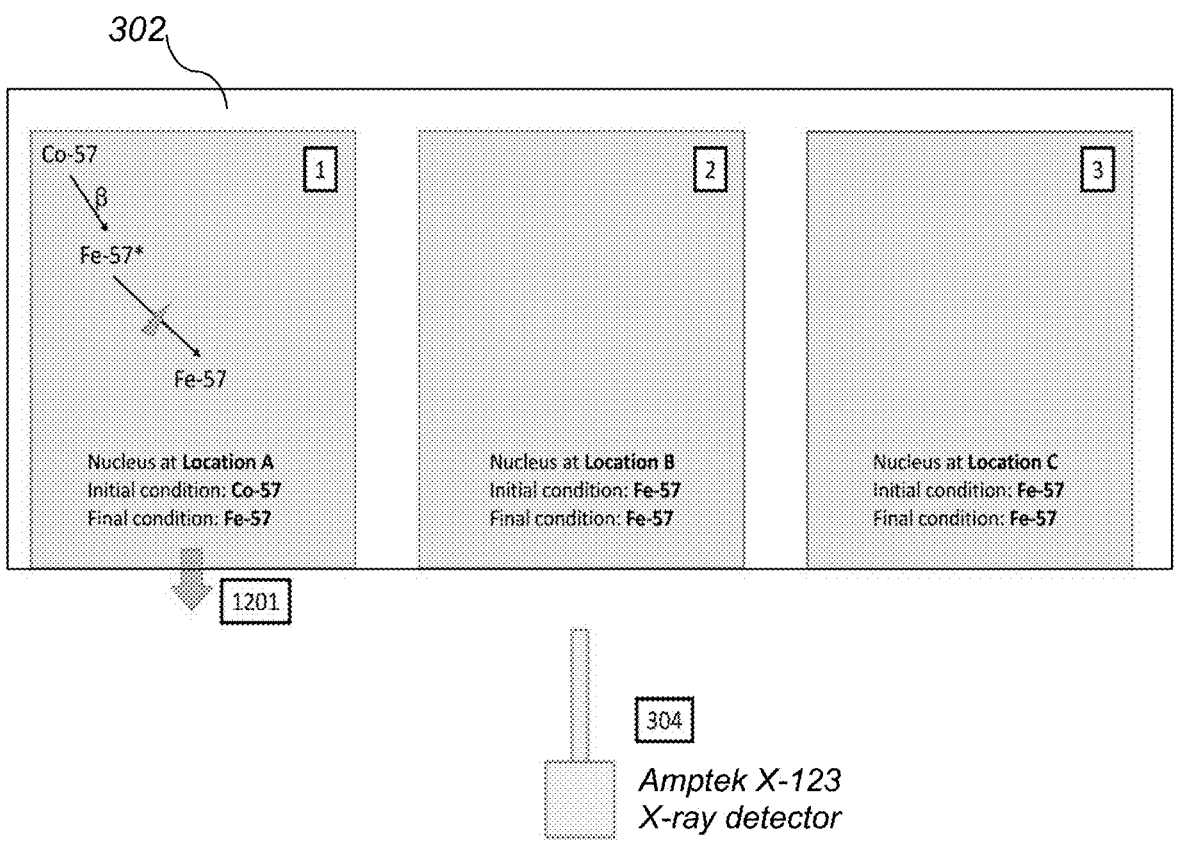
FIG. 12 depicts that in the absence of an excited phonon mode, photon emission is to be expected only from those locations that are occupied by Co-57 nuclei, where Co-57 decays to excited state Fe-57* and ground state Fe-57 eventually.
Figure 13:
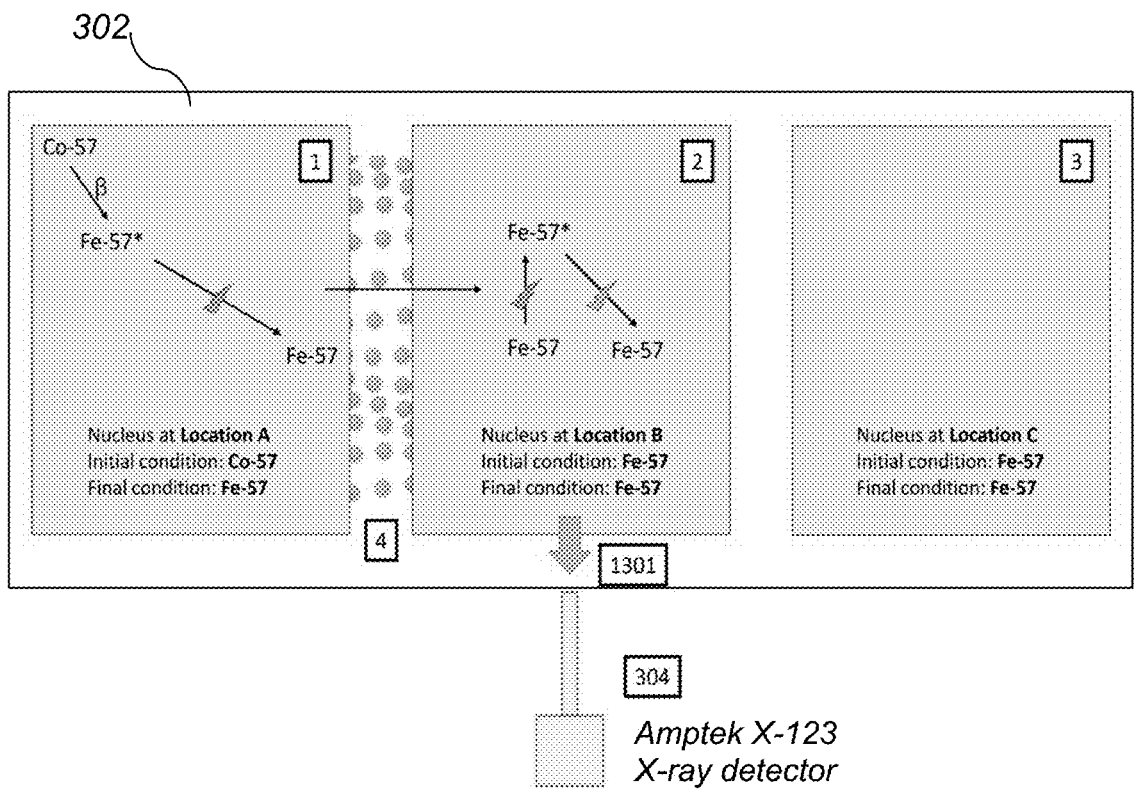
FIG. 13 depicts that in the presence of an excited phonon mode, photon emission is to be expected from other locations connected to the same excited phonon mode due to phonon-mediated de-excitation of Fe-57* and excitation of ground state Fe-57 nuclei which can then decay to ground state with probability x through a photon emission from that location.
Figure 14:
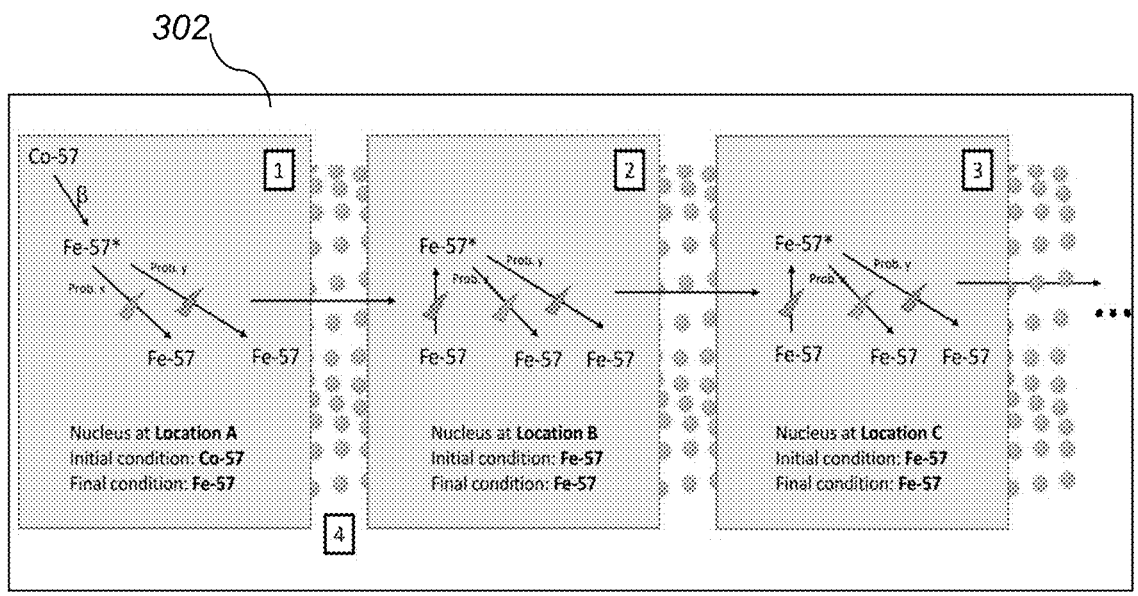
FIG. 14 depicts the possible de-excitation pathways of FIGS. 12-13 in a more general manner, illustrating that in the general case for the given nuclei both de-excitation pathways can manifest with given probabilities/rates.

An illustration how delocalization effects follow from phonon-mediated energy exchange between nuclei is shown in FIG. 11-14. FIG. 11 illustrates in an exemplary manner the locations of three distinct nuclei (Co-57, Fe-57, and another Fe-57) in the same atomic lattice which is capable of sustaining a common excited phonon mode of large enough energy to enable phonon-nuclear coupling mechanisms. In this example, 1 at Location A is a Co-57 nucleus, 2 at Location B is a Fe-57 nucleus, and 3 at Location C is a Fe-57 nucleus. FIG. 12 illustrates the conventional expectation for observable photon emission originating from radiative decay when considering these three locations. Photon emission would not be expected from Location B and Location C. At Location A, photon emission would be expected after the Co-57 nucleus has decayed via Beta decay to a Fe-57* nucleus i.e. a Fe-57 nucleus in an excited state. Shortly after, such an excited Fe-57* nucleus would conventionally de-excite to its ground state via photon emission. The resulting photon could then be observed as photon emission originating from Location A 1201. The presence of the above described excited phonon mode, would enable other outcomes. One of such possible outcomes is illustrated in an exemplary manner in FIG. 13: after the Beta decay of the Co-57 and in the presence of said phonon mode, the Fe-57* does not de-excite via photon emission but de-excites via phonon-mediated excitation transfer. The excitation energy of the Fe-57* nucleus at Location A transfers via the common phonon mode to the ground state Fe-57 nucleus at Location B (a receiving nucleus) which can accommodate as nuclear excitation the same quantum of energy that de-excited from the donor nucleus. This being the case because the energy levels of the donor and receiver nuclei are identical, since both are the same nuclide Fe-57. In this example illustrated in FIG. 13, the now excited Fe-57* nucleus at Location B de-excites conventionally (via radiative decay) and emits a photon from Location B. In this case, a photon is unexpectedly not observed in Location B 1301 and is unexpectedly not observed in Location A during operation of the apparatus i.e. in the presence of the above described excited phonon mode. FIG. 14 expands this specific example in a more general way, taking into account a subset of probabilistic outcomes. Even under the presence of a common excited phonon mode, the Fe-57* nucleus at Location A can de-excite conventionally via photon-emission with a particular probability. In the general case, there is also a probability for excitation transfer to occur repeatedly before conventional de-excitation takes place.

The earlier introduction of delocalization via excitation transfer and the example in FIGS. 11-13 focused on microscopic locations of individual nuclei and photon emission thereof. In the next section, macroscopic implications will be discussed.

Under normal conditions, the macroscopically observed local emission strength is expected to be proportional to the local Co-57 concentration. In the presence of phonon-mediated non-resonant excitation transfer, the macroscopically observed local emission strength no longer matches the Co-57 concentration.

When considering a macroscopic area, statistics have to be considered as well. In this case, rather than causing the absolute presence or absence of expected photon emission as inferred in the above microscopic example, delocalization effects manifest as a decrease in the average photon emission of a particular area in case of dominant phonon-mediated de-excitation in that area, and as an enhancement in the average photon emission of a particular area in case of dominant phonon-mediated excitation in that area. Therefore, the presence of phonon-nuclear coupling related mechanisms can be observed in some instances through a decrease in photon emission from areas with a high density of excited nuclei and a low density of ground state potential receiver nuclei, and in some instances through an increase in photon emission from areas with a low density or excited nuclei and a high density of ground state potential receiver nuclei—as long as potential donors and receivers are connected to common excited phonon modes whose energies are large enough to enable phonon-nuclear coupling based mechanisms and effects, such as during operation of the disclosed apparatus in some embodiments. Consequently, changes in the spatial distribution of photon emission under the presence of excited phonon modes are effects that follow from phonon-nuclear coupling and can be used to observe, diagnose, and employ phonon-mediated excitation and de-excitation of atomic nuclei. This is the case in the present invention.

Macroscopic Effects: Angular Anisotropy

Another way to reproducibly employ phonon-nuclear coupling based mechanisms to cause macroscopically observable effects is through angular anisotropy resulting from phonon-mediated resonant excitation transfer. In other words, phonon-nuclear coupling mechanisms in action lead to changes in the angular distribution of photons emitted from conventional de-excitation (radiative decay). This effect is expected due to excited nuclei aligning in phase when being excited through common phonon modes such as in cases of resonant excitation transfer. Thus excited nuclei are then in identical nuclear orientation, leading to identical angles of photon emission when photons are emitted through conventional de-excitation (radiative decay). Consequently, photon emission from nuclear excitation caused by phonon-mediated resonant excitation transfer is often collimated. Collimated photon emission, especially at monoenergetic levels, has multiple industrial uses such as in X-ray lithography and micromachining.

In the absence of special treatment, photon emission from conventional de-excitation of excited state nuclei is expected to be isotropic i.e. constant in its angular distribution. That is because the nuclear orientation of the emitting nuclei is random and for a large number of emitting nuclei, statistics lead to a constant distribution of emission across a given solid angle. Macroscopic observations of collimation and beam formation can occur when a large number of the photon-emitting nuclei have been excited via phonon-mediated resonant excitation transfer. If a smaller subset of photon-emitting nuclei has been excited this way, then such mechanisms manifest macroscopically as change in the angular distribution of photon emission. Specifically, the observed emission across a given solid angle is then a superposition of emission from some nuclei that are still oriented randomly and emit photons at a constant angular distribution, and other nuclei that have been aligned through phonon-mediated energy exchange and emit photons in a collimated manner. Consequently, changes in the angular distribution of photon emission in the presence of phonon modes are effects that follow from phonon-nuclear coupling and can be used to observe, diagnose, and employ phonon-mediated excitation and de-excitation of atomic nuclei. This is the case in the present invention.

In order to achieve nuclear phase coherence and corresponding collimation of photon emission as a result of up-conversion, it is necessary to have a region in the condensed matter medium where resonant excitation transfer can also occur. Up-conversion does not automatically and necessarily lead to collimated emission. Compared to the locations in the condensed matter medium where up-conversion takes place, the resonant excitation transfer locations need to have comparatively weaker phonon-nuclear coupling strength in order to make resonant excitation transfer dominant. Lower phonon-nuclear coupling strength can be achieved by adjusting the variables that determine phonon-nuclear coupling strength discussed above. From this follows that an industrial device for collimated photon emission from up-conversion requires at least two regions, in each of which a different phonon-nuclear coupling based mechanism dominates (such as up-conversion for initial excitation and resonant excitation transfer for collimation). The combination of both can then lead to collimated photon emission from phonon-mediated excitation of nuclear states in the absence of already excited states.

Other Macroscopic Effects

Other macroscopic effects, depending on the relative presence of different phonon-nuclear coupling based mechanisms, include higher or lower levels of photon and energetic particle emission than conventionally expected as well as higher phonon energies and populations in the affected condensed matter environment than conventionally expected. The latter typically manifests macroscopically as heat. Such macroscopic effects can be useful in many applications and are explicitly encompassed by this disclosure. However, due to the qualitative changes associated with delocalization and angular anisotropy induced by phonon-mediated excitation and de-excitation of atomic nuclei from excitation transfer—as opposed to other, often more ambiguous and merely quantitative changes—the exemplary embodiment described below pays particular attention to the macroscopic effects that manifest qualitatively.

Lastly, quantum-mechanical interaction between nuclear states and phonon modes can further lead to so called mixed states at intermediate energy levels (compared to the available energy levels of nuclei in the medium). Such mixed states can also be excited and de-excited and can be advantageous if specific energy levels are desired that mixed states can provide.

Restatement of Contributions

This present invention provides a system and a method to reproducibly and observably employ phonon-mediated excitation and de-excitation of atomic nuclei. To that end, the invention draws on delocalization and angular anisotropy effects caused by phonon-mediated excitation transfer. The presented method and apparatus establish for the first time the reproducible and observable existence of phonon-nuclear coupling and the presented energy exchange mechanisms that follow from it. As such, the invention lays the foundation for a new tool in the toolbox of nuclear engineers and the new field of phonon-based nuclear engineering more generally.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each schematic drawing, at least one embodiment is made according to the apparent relative scale of the drawing.

System Assembly

Figure 3A:
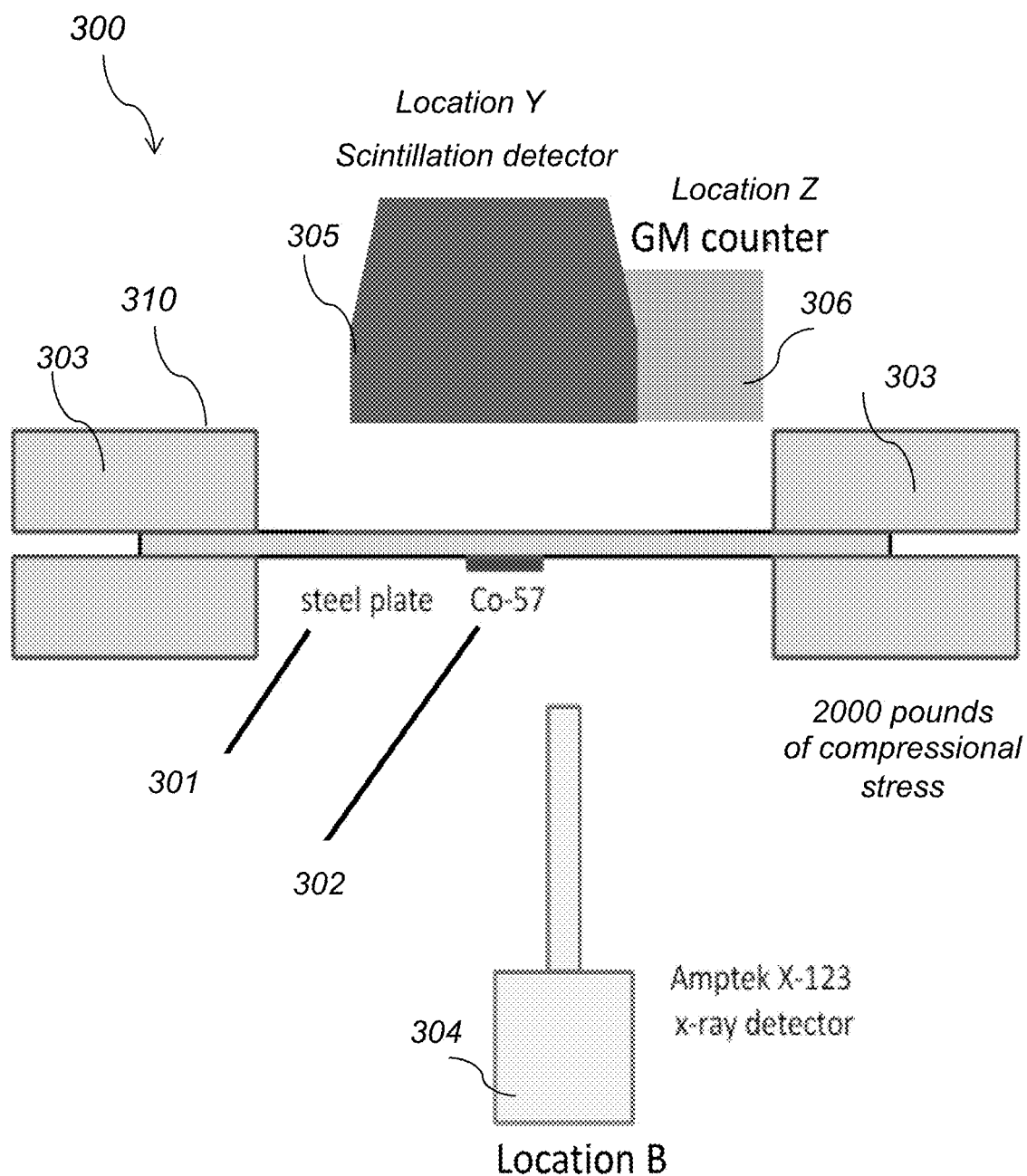
FIG. 3A depicts a side view of an exemplary system used to excite and de-excite atomic nuclei via phonons, according to this invention.
Figure 3B:
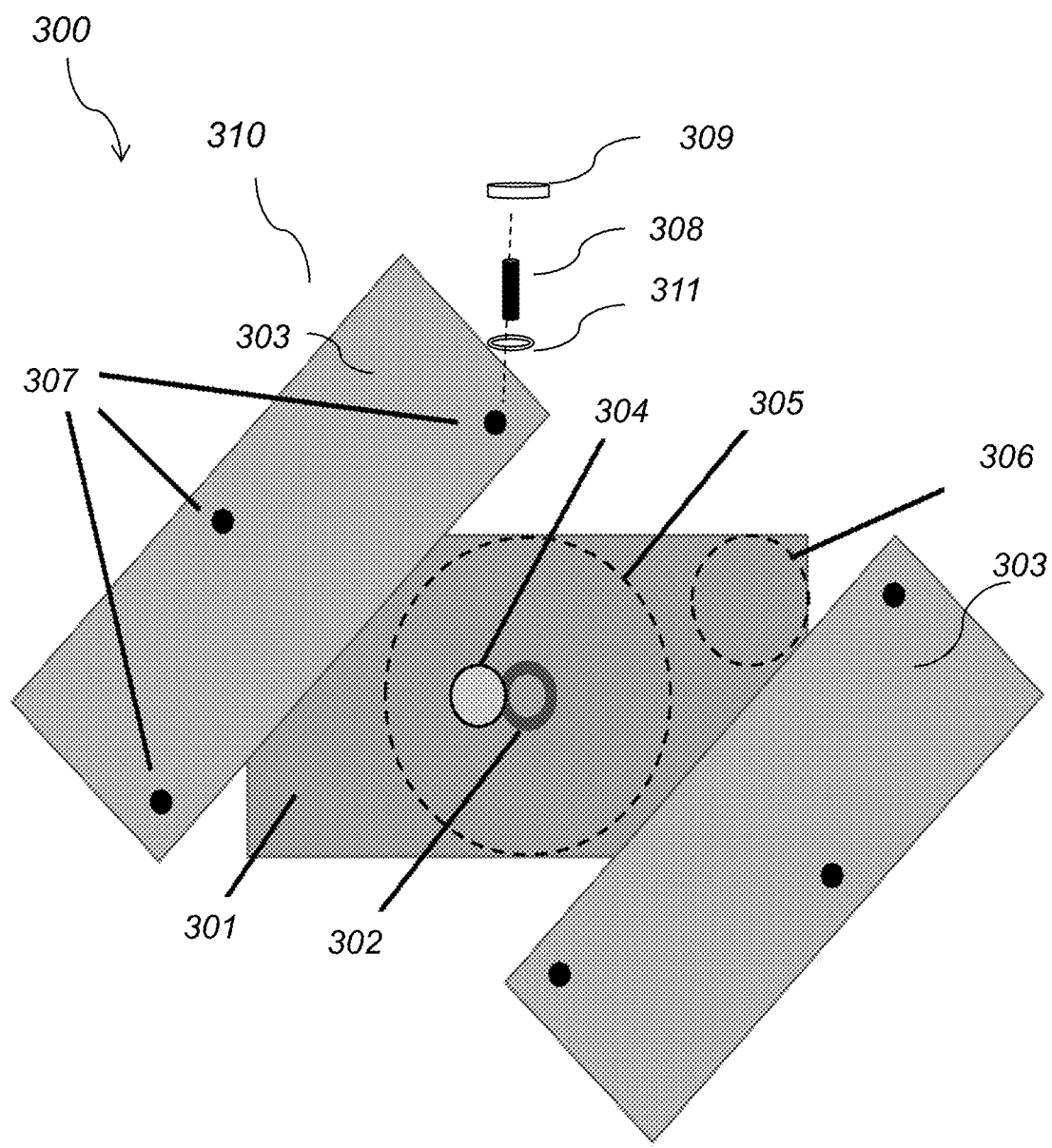
FIG. 3B depicts a bottom view of the exemplary system of FIG. 3A.

A schematic of an exemplary embodiment of the system is shown in FIG. 3A in side view. FIG. 3B shows the same exemplary embodiment in bottom view. The system 300 includes a sample assembly 310, an X-ray detector 304 at location B, a scintillation detector 305 and a Geiger counter 306. The sample assembly 310 includes a plate 301, and two sets of clamps 303 that support the ends of plate 301. In one example, plate 301 is an elongated plate and has dimensions of 3"×6"×5/32". In one example, plate 301 is a steel plate made of rolled low-carbon steel (McMaster-Carr part number 1388K546). Such a steel plate is known to contain a dislocation density on the order of $10^8/cm^2$ to $10^{16}/cm^2$. Dislocations are crystallographic defects that move through the condensed matter lattice upon the application of mechanical stress. Moving dislocations in turn generate and scatter local lattice vibrations i.e. excited phonon modes such as the ones discussed in the section above. The energy of such excited phonon modes depends on the frequencies and amplitudes of corresponding vibrations. Dislocations moving slowly are effective in scattering phonons already present (leading to a non-isotropic and non-equilibrium distributions) and also in making new phonons. Based on calculations, one expects moving dislocations to scatter high frequency phonons in the THz regime. Such high frequencies in turn lead to high phonon energies. Dislocation movement can be caused by plastic deformation such as during the application of compressional, tensile, and/or shear stress.

At the center point of the steel plate 301, a radioactive substrate 302 is placed.

Figure 3C:
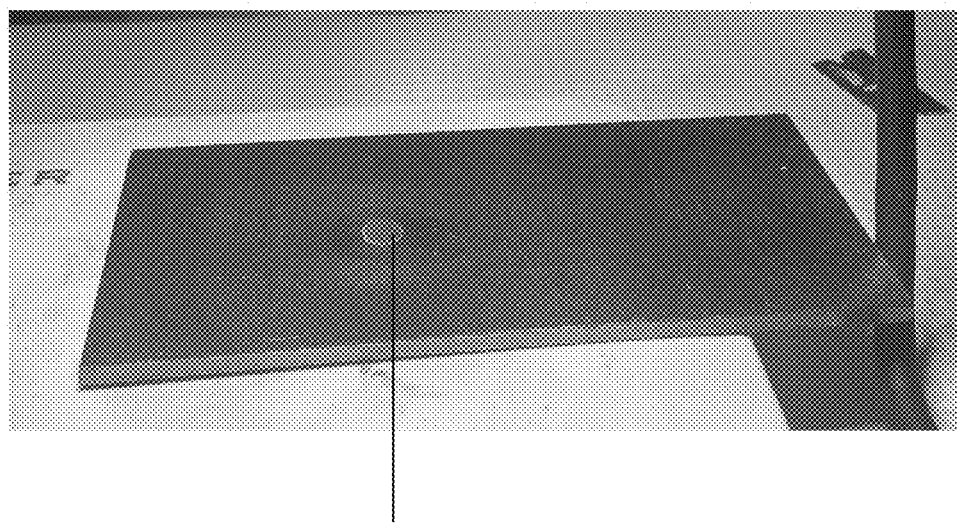
FIG. 3C is a picture of the steel plate 301 with the ring-shaped substrate 302 used in the system of FIG. 3A.

Specifically, a 0.05 ml drop of a 57CoCl2 in 0.1 M HCl solution (from Eckert & Ziegler) is used with an activity of approximately 250 μCi. The drop of solution is left to evaporate over the course of one hour and forms a grey ring with a diameter of approximately 12 mm on the surface of the steel plate. The sample assembly now includes a ring-shaped substrate 302 of evaporated 57CoCl2 solution bonded to the underlying steel plate, as shown in FIG. 3C. The substrate 302 comprises a declining number of radioactive Co-57 nuclei which act as a source of nuclear excitation. Substrate 302 also provides a steady, short-lived presence of excited Fe-57* nuclei resulting from decaying Co-57 nuclei as well as Fe-57 nuclei in ground state from earlier Co-57 decay. Additional ground state Fe-57 nuclei are present in the underlying steel plate 301 due to the natural occurrence of Fe-57 in iron. The ring-shaped substrate 302 that results from the evaporated solution is covered by epoxy (J-B Weld 50112 Clear 25 ml ClearWeld Quick-Setting Epoxy Syringe). The circular-shaped epoxy layer on top of the substrate measures approximately 30 mm in diameter and 0.5 mm in thickness. The subsystem described in this paragraph is referred to below as the sample.

Another source of phonons in such a configuration is friction. When a system such as the sample described in the last paragraph is stressed, friction occurs at boundaries (including boundaries between materials, grain boundaries etc.) such as at the interfaces of the plate and the substrate, the substrate and the epoxy, and the plate and the epoxy.

Next, the two clamps 303 are loosely attached to the steel plate on opposite corners of the plate to provide mechanical stress during operation, as shown in FIG. 3B. Each clamp 303 includes two pieces of plywood of dimensions 2"×6"×1" and covers a corner of the steel plate 301 such that each area on the steel plate covered by a clamp forms an isosceles triangle with side lengths of approximately 1.5". Three 7 mm holes 307 are drilled in each piece of plywood. The holes are positioned such that a triangle is formed as shown in FIG. 3B. Next, six ¼-20 bolts 308 and corresponding nuts 309 and washers 311 are screwed on to connect both pieces of plywood of each clamp 303. The nuts 309 and bolts 308 are tightened enough to hold the clamps 303 in place but not exerting additional stress at this point, i.e. before operation.

The entire sample assembly 310, including the steel plate 301, the epoxy-covered, evaporated substrate 302, and the clamps 303 on the corners of the steel plate, is then placed on a simple mounting rack that has the three detectors 304, 305, 306 mounted in fixed positions.

Figure 4:
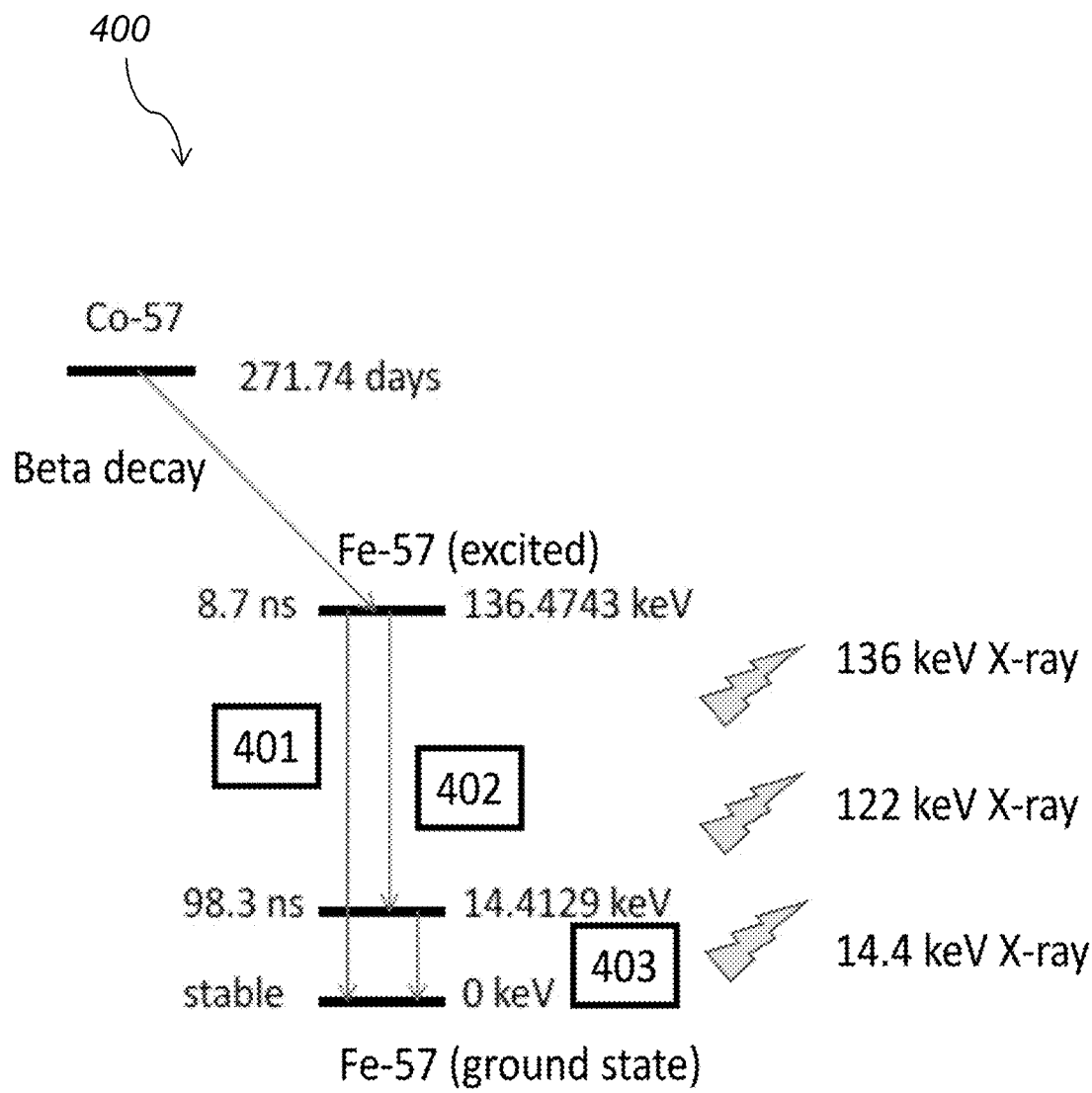
FIG. 4 illustrates nuclear states and corresponding energy levels as well as the decay pathways of Co-57.

The material composition of the sample as well as its microstructure are important and have been chosen accordingly in this exemplary embodiment. First, the sample needs to be able to sustain enough phonons as well as high enough phonon energies in excited phonon modes that affect those nuclei that are to be excited or de-excited. For the exemplary embodiment presented in this section, this is the case with the above described sample assembly, specifically the condensed matter environments of the steel plate, the substrate, and the epoxy cover. Second, the sample needs to allow for phonons to be created in the material. In the exemplary embodiment presented in this section, phonons are generated via stress-induced dislocation movement and friction. Third, the discrete energy levels of the involved materials and the resulting energy quanta associated with excitation and de-excitation need to be considered. For excitation of nuclei to take place, enough energy needs to be provided either by excited phonon modes, or other excited nuclei, or a combination of both. For de-excitation of nuclei to take place, the phonon modes, or other nuclei, or a combination of both, need to be capable of absorbing the energy released from de-excitation. In the exemplary embodiment presented in this section, the energy levels of Fe-57 nuclei play a central role in this regard. FIG. 4 illustrates the energy levels 400 of Fe-57 nuclei. Fe-57 nuclei exhibit a ground state (at 0 keV) and two excited states: one excited state at 14 keV and one excited state at 136 keV. A decaying Co-57 nucleus results in a Fe-57* nucleus which is excited at the higher excited state of 136 keV. This excited nucleus can then de-excite directly to ground state emitting 136 keV of excitation energy 401 or de-excite to the lower excited state of 14 keV, emitting 122 keV of excitation energy 402, and in a second step de-excite from the lower excited state of 14 keV to ground state 403. Consequently, discrete energy quanta of 14 keV, 136 keV, and 122 keV are available for being involved in the excitation or de-excitation of atomic nuclei. Because of the presence of a large number of ground state Fe-57 nuclei in the sample, the sample thereby contains a large number of potential receiver nuclei whose energy levels match the potential donor nuclei. This match of potential donor and receiver energy levels increases the probability of phonon-mediated de-excitation and excitation to occur between Fe-57 in excited states and Fe-57 in ground state. For the exemplary embodiment presented in this section, a matching of capacities for energy emission and absorption in order to maximize the probabilities of the desired reactions to occur has been considered in this manner.

Detection

Figure 5:
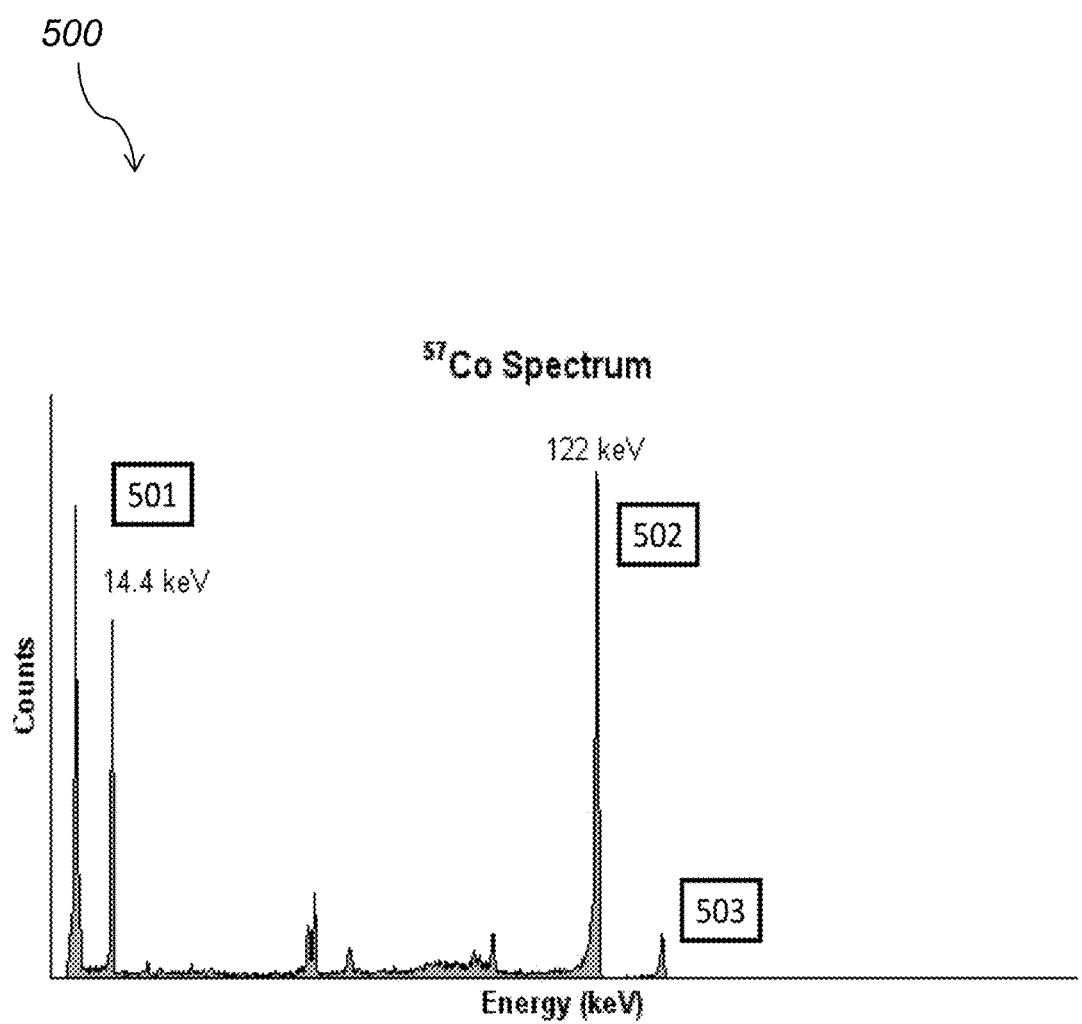
FIG. 5 shows a Gamma/X-ray spectrum of a Co-57 source, exhibiting peaks at the energy levels shown in FIG. 4.

As illustrated in FIGS. 12-14, in the absence of phonons, excited nuclei can be expected to de-excite conventionally via photon emission. In the exemplary embodiment that involves Fe-57, the released energy quanta of 14 keV, 136 keV, and 122 keV can then be observed as energetic photons emitted from the sites of the former Co-57 nuclei (which after Beta decay are Fe-57* nuclei). Observation of such photons takes place through a photon energy spectrum produced by a Gamma/X-ray spectrometer 304. In one example, the Gamma/X-ray spectrometer 304 is an Amptek X123 spectrometer. In another example, the Gamma/X-ray spectrometer 344 is an Ortec high purity Ge Gamma spectrometer. Such a photon energy spectrum 500 (Gamma/X-ray spectrum) exhibits peaks at energy levels of 14 keV 501, 136 keV 503, and 122 keV 502 from photon emission resulting from conventional nuclear de-excitation of Co-57, as shown in FIG. 5. In this text, the 14 keV transition of Fe-57 is described as the lower energy nuclear transition and the 122 and 136 keV transitions of Fe-57 are described as the higher energy nuclear transitions.

Similarly, such emitted photons are observed with a Geiger Mueller (GM) counter 306 as counts. A GM counter 306 detects the presence of photons in the solid angle that the detector covers and counts them. However, a GM counter 306 does not resolve the photons' energies. Detected counts per second can be retrieved from the detector, assigned with a timestamp, and stored. Despite the lack of energy resolution, a GM counter 306 is useful in detecting changes in photon emission in a particular solid angle such as caused by delocalization and angular anisotropy effects.

In the case of the above mentioned photon emission from excited Fe-57*, most GM counters are most sensitive to the higher energy photons at 122 and 136 keV energy levels compared to lower energy photons at 14 keV.

In the exemplary embodiment presented in this section, three detectors 304, 305 and 306 are placed in three separate locations above and below the sample assembly 310 in order to monitor the radiation response of the sample and changes thereof during operation. In this example, the scintillation detector 305 and GM counter 306 are placed above the sample assembly 310 and the Gamma/X-ray detector 304 is placed below the sample assembly 310, as shown in FIG. 3A. All detectors are placed at normal angles approximately 1" away from the surface of the steel plate on each side. The three detectors are described in more detail below.

Figure 8:
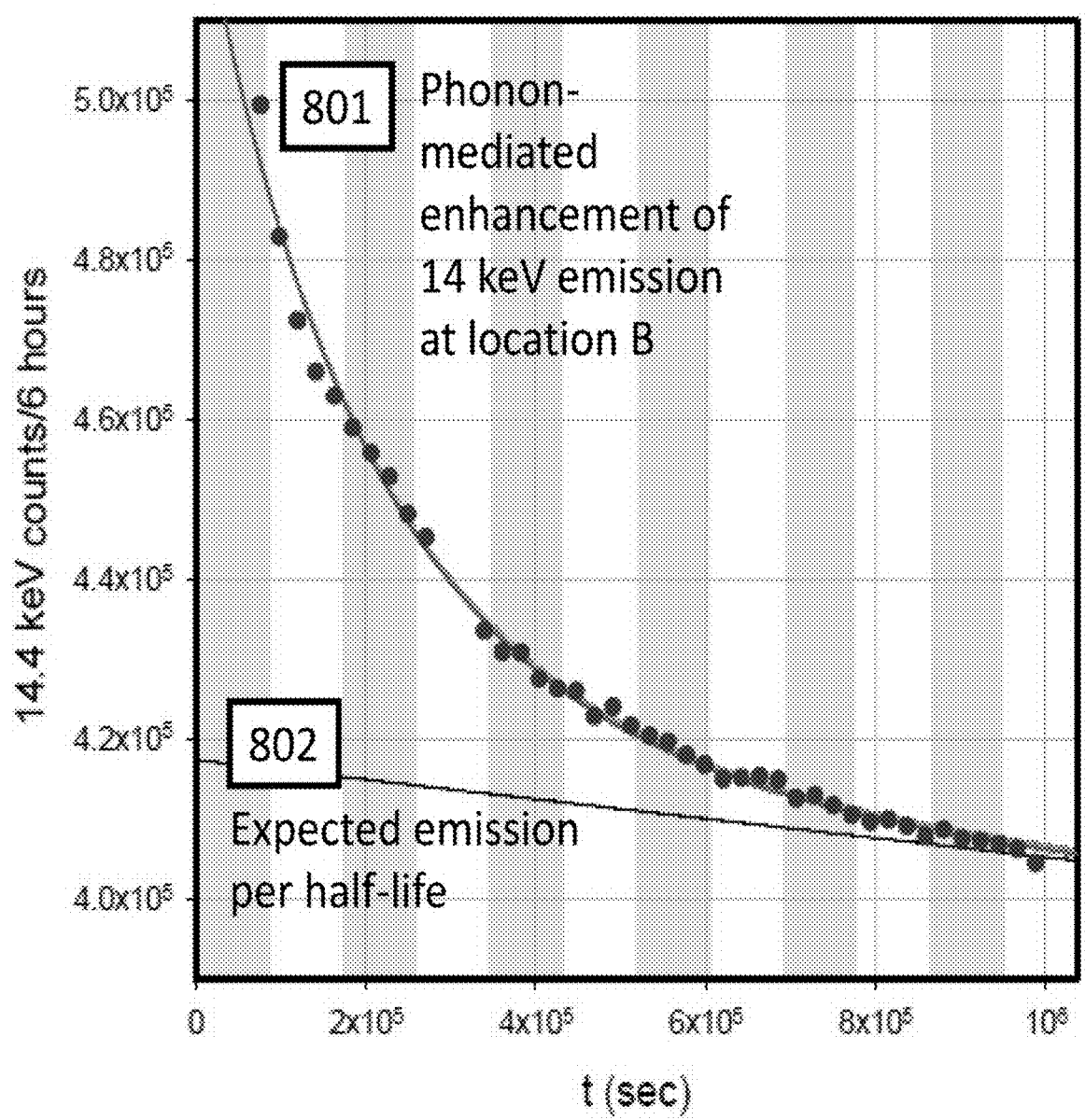
FIG. 8 shows a plot depicting a phonon-mediated enhancement of emission from the 14 keV nuclear energy levels in the Gamma spectrum of a Co-57 source.

The Gamma/X-ray detector 304 in Location B, facing an outer edge of the ring-shaped substrate, is an Amptek X-123 Si-PIN Gamma/X-ray spectrometer with a 0.5 mil Be window and 6 mm^2 detection area. The detector 304 continuously records one accumulated spectrum every minute across the energy range from 1 to 28 keV and resolves such spectra through 2048 channels. For time-dependent data analysis, the time history data from this detector 304, shown in FIG. 8, is based on the sum of 60 channels (corresponding to a 788 eV wide energy range) for the Fe-57 14.4 keV line.

On the back side of the steel plate 301 (i.e. above the sample assembly 310 and not directly facing the ring-shaped substrate 302) a scintillator detector 305 is used for Gamma spectrometry. This detector 305 is positioned in Location Y, located concentrically above the ring-shaped sample substrate 302 on the other side of the plate 301, as illustrated in FIG. 3B. This detector 305 uses a 250 µm ZnS (Ag) scintillator and a Hamamatsu photomultiplier tube with 3" diameter (model R6233). A Radfilm cover is used to block visible light. The detector is driven by a Gamma Spectacular GS-2000-PRO high voltage driver and resulting analog signals get digitized via a Focusrite 192 KHz low-noise USB Analog-Digital-Converter. Resulting digital signals are converted to spectra via the open source software Theremino MCA. In these spectra, 2048 channels resolve an energy range from approximately 5 keV to 200 keV whereas the choice of scintillator leaves the detector most sensitive to lower energy photons. Spectra with this detector are accumulated and recorded once per minute and assigned with timestamps, similar to the other detectors. Because this detector is sensitive to lower energies and it faces the back side of the steel plate to which the 14 keV photons emitted from excited Fe-57* nuclei on the front side can barely penetrate, this detector is most sensitive to X-ray fluorescence effects on the back side of the steel plate caused by harder Gammas such as the 122 and 136 keV lines from the ring-shaped sample substrate. This detector can therefore be viewed as a proxy for higher energy photons on the back side of the plate, mostly across the solid angle that the detector covers.

On the back side of the steel plate (i.e. not directly facing the ring-shaped substrate 302), a GM counter 306 is used for counting mostly harder Gammas at this part of the solid angle. This detector 306 is positioned in Location Z, above one of the exposed corners of the steel plate (one of the corners with no clamps on it), as illustrated in FIG. 3B. The GM counter is a Ludlum Model 44-88 Alpha Beta Gamma detector probe connected to a Ludlum 2350-1 Data Logger. The Ludlum Data Logger reads counts from this detector approximately once per second, assigns a timestamp, and records the values.

Operation and Response

The operation of the exemplary embodiment presented in this section includes the generation of phonons that cause phonon-mediated excitation and de-excitation of nuclear states in the sample. To exhibit the effects of operation, data is taken during operation and outside of operation.

Figure 6:
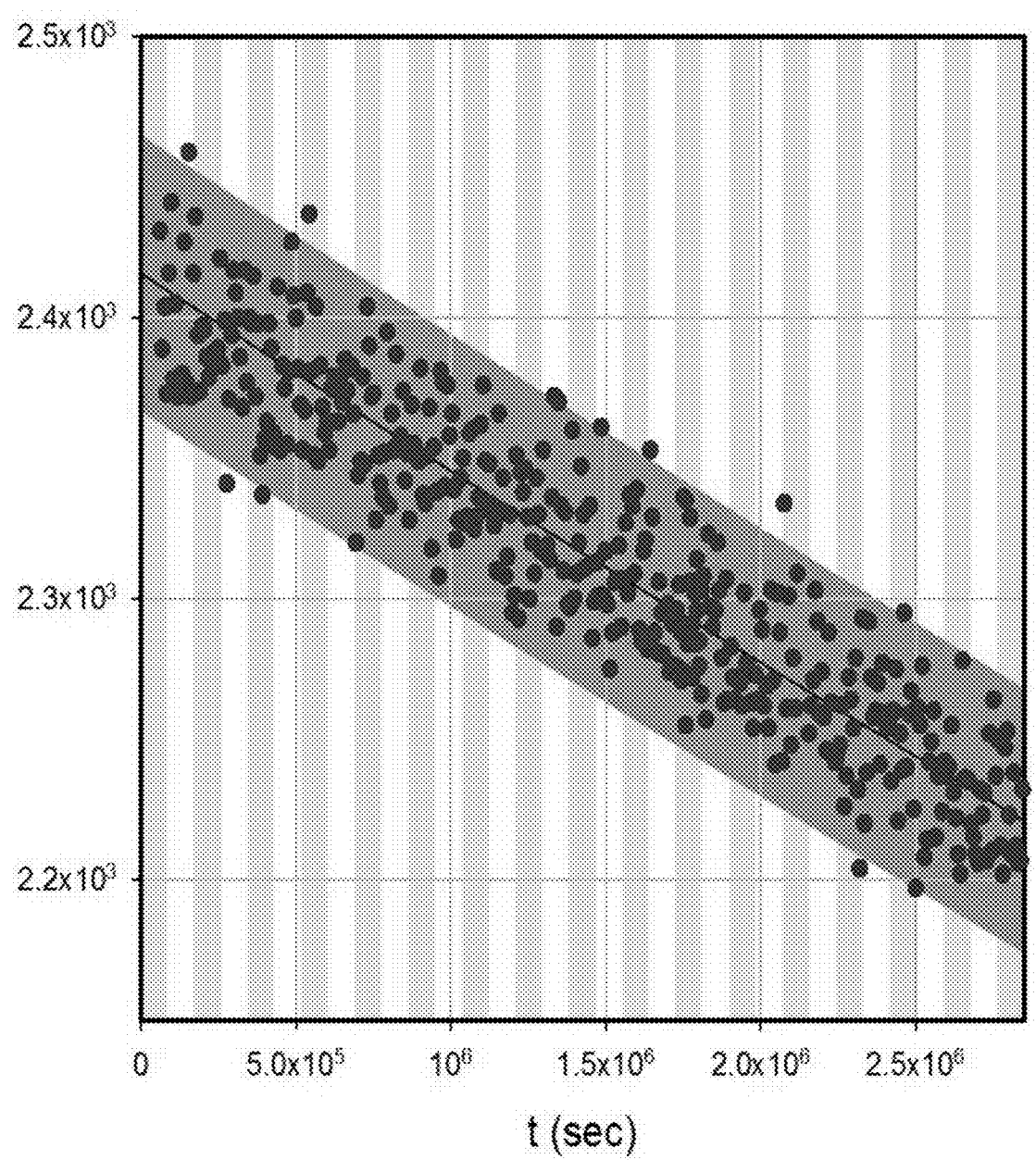
FIG. 6 shows a plot of time history data across a 30-day period of a peak in the Gamma spectrum shown in FIG. 5.
Figure 7:
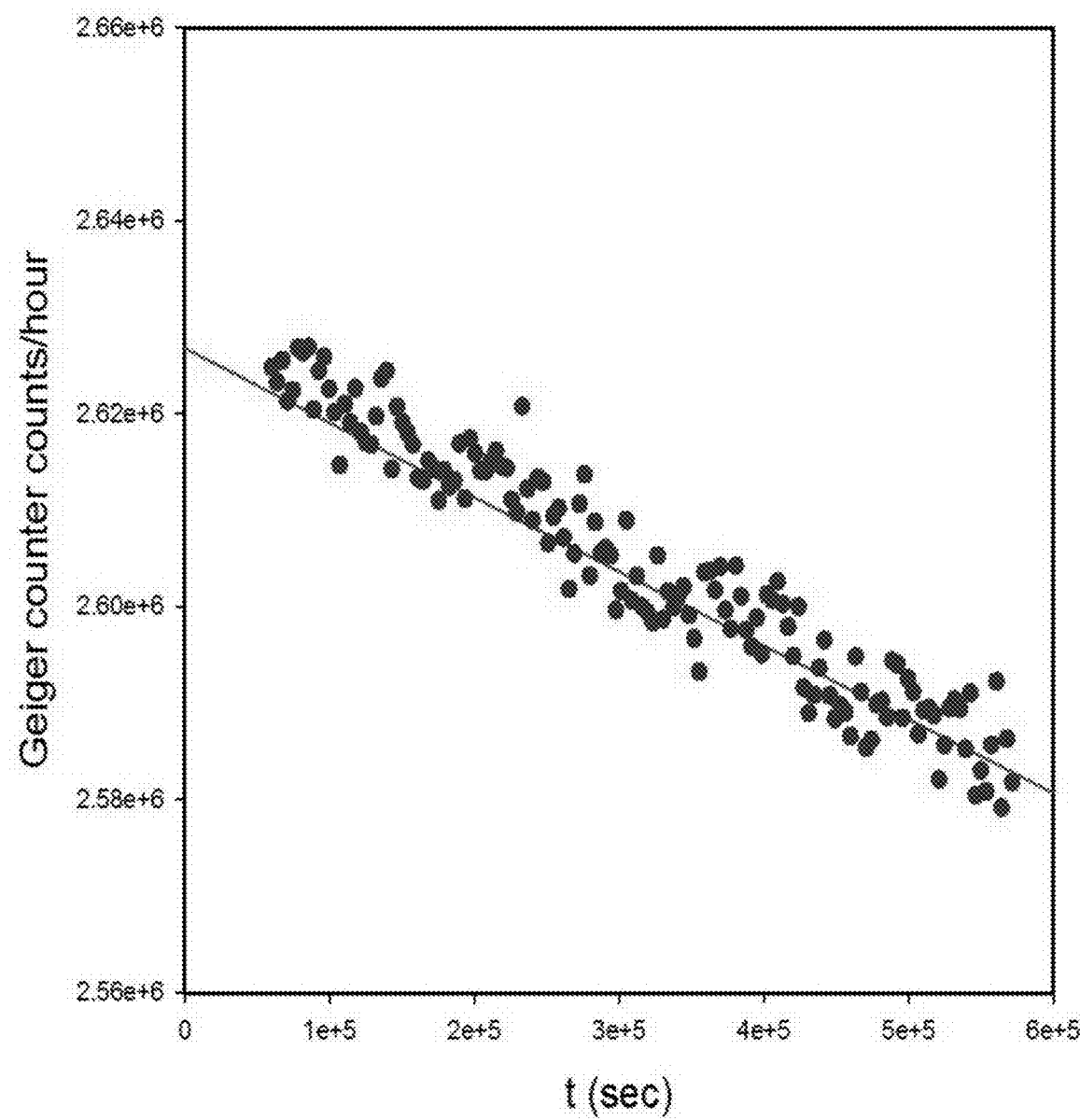
FIG. 7 shows a plot of time history data across a five-day period of Geiger counter counts.

Time-series data taken by the GM counter 306 outside of operation is shown in FIG. 7. The graph in FIG. 7 shows data across a period of approximately five days. During this period, the number of emitted photons gradually and consistently decreases, consistent with the known Co-57 decay rate. This decrease is expected as over time, the number of remaining Co-57 nuclei decreases, as more and more decay to Fe-57. The straight line in the graph marks the expected decrease of counts based on the well-documented half-life of Co-57. FIG. 6 presents a similar picture. The graph in FIG. 6 shows the number of photons measured by the X123 detector 304 outside of operation. Again, the number of measured photons decreases consistent with the known half-life of the Co-57. FIG. 6 and FIG. 7 depict data that are expected from this configuration with no novel mechanisms or effects taking place.

The apparatus is put in operation by generating phonons. In the exemplary embodiment presented in this section, phonons are generated through stress-induced dislocation movement and friction in the condensed matter sample. Concretely, this is done by tightening the clamps 303 on the corners of the sample assembly via the three nuts 309 and bolts 308 on each clamp to create approximately 2000 lbs. of normal compressional stress on each corner of the steel plate 301. The stress induced by the clamps 303 leads to a stress field across the steel plate 301, causing dislocations to move across the steel plate 301. Due to the geometry of the clamps 303 and the plate 301, the stress field has compressional, shear, and tensile components. The moving dislocations lead to the creation and scattering of local phonons in many parts of the plate. These phonons can then interact with atomic nuclei through phonon-nuclear coupling, as described above. Which phonon-nuclear coupling based mechanisms manifest (resonant excitation transfer, non-resonant excitation transfer, up-conversion, down-conversion, subdivision) is determined by the strength of phonon-nuclear coupling (generally) and in this particular embodiment by the energy of the excited phonon modes (which increases with the amplitude of vibrations e.g. when more stress is applied) as well as the nuclear states of interest. On the latter point, at given energies in excited phonon modes, higher order mechanisms (such as non-resonant excitation transfer) tend to manifest with lower energy nuclear transitions (such as the 14 keV transition of Fe-57) whereas lower energy mechanisms (such as resonant excitation transfer) tend to manifest with higher energy nuclear transitions (such as the 136 keV and 122 keV transitions of Fe-57). Again, higher order mechanisms can also manifest with higher energy nuclear transitions if the available total energies in excited phonon modes are increased (and, depending on the magnitude of the increase, even higher order mechanisms can then manifest on the lower energy transitions). This is how up-conversion, down-conversion, or subdivision involving particular nuclear transitions can be implemented in another exemplary embodiment, (following from the presently discussed exemplary embodiment discussed above and as illustrated in FIG. 3A).

Figure 25:
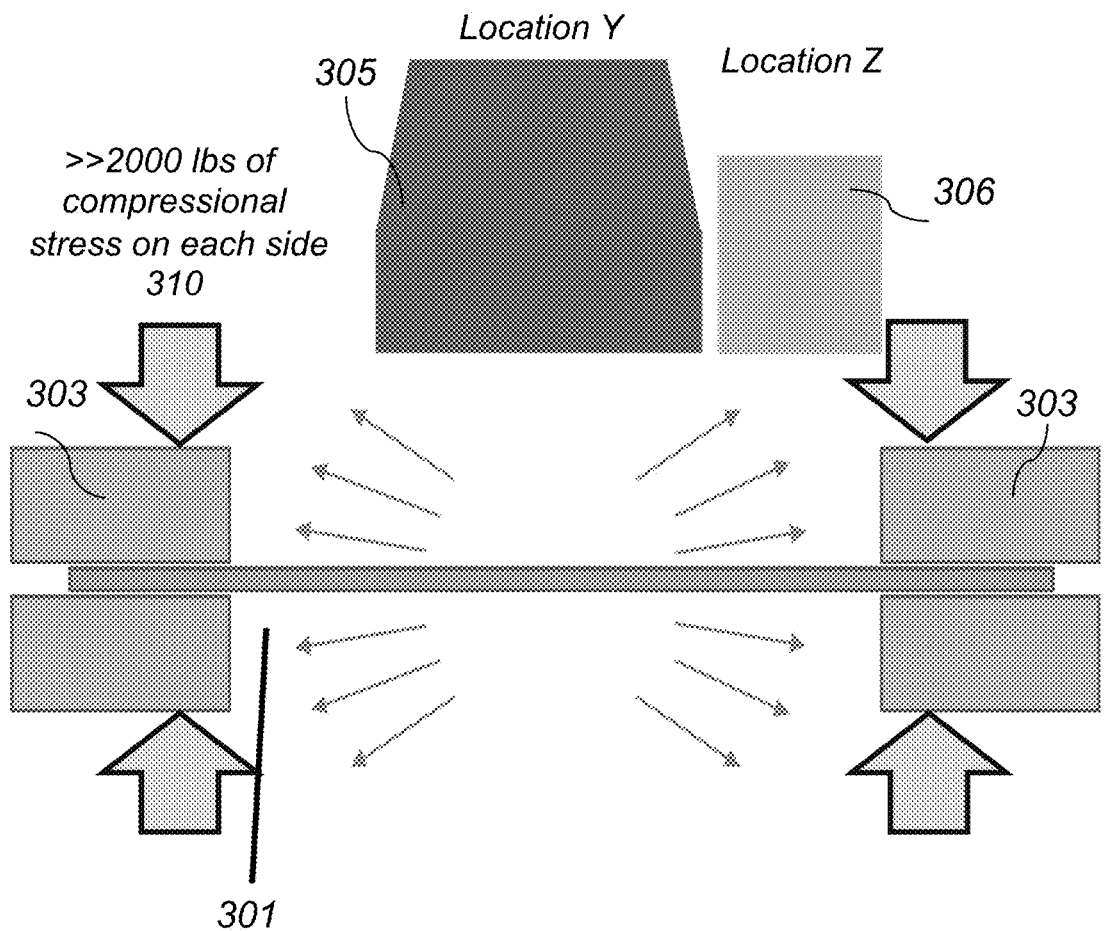
FIG. 25 depicts a side view of yet another embodiment of the system used to excite atomic nuclei via phonons, according to this invention.

FIG. 25 illustrates such another exemplary embodiment exhibiting up-conversion during operation. In this embodiment, no radioactive substrate is placed on the steel plate. The mechanical stress, starting from 2000 lbs, is gradually increased until the energy in excited phonon modes is large enough to allow for the up-conversion mechanism to manifest. This is the case, when Fe-57 nuclei in the steel plate get excited and corresponding photon emission from conventional de-excitation (radiative decay) can be observed.

Returning to the detailed description of the exemplary embodiment as illustrated in FIG. 3A, in the vicinity of the substrate, phonons can mediate de-excitation of excited Fe-57* nuclei and excitation of ground state Fe-57 through excitation transfer, leading to changes in the spatial distribution of emission (delocalization) and changes in the angular distribution of emission (angular anisotropy). The delocalization and anisotropy effects manifest in the detectors as decreases and increases of detected photons. FIG. 8 shows time-dependent photon counts in the 14 keV energy range from the X123 Gamma spectrometer 304 at Location B during operation of the apparatus i.e. after applying stress via the clamps. The graph in FIG. 8 exhibits an enhancement of the 14 keV photon emission at Location B which gradually decreases until approaching the steady and consistent decline of photon emission expected from the decay of remaining Co-57 nuclei. The enhancement of photon emission at Location B i.e. at the edge of the ring-shaped sample substrate is caused by phonon-mediated transfer of nuclear excitation into this area. Dislocation movement from the application of a one-time applied and held-in-place mechanical stress decreases over time which has been described as cold flow or creep. With a gradual reduction of dislocation movement and friction, generation or scattering of phonons also reduces, and consequently phonon-mediated excitation and de-excitation effects reduce too. By the time at the end of the graph in FIG. 8, almost no observable delocalization effects can be registered any more by the detector at Location B.

Figure 9:
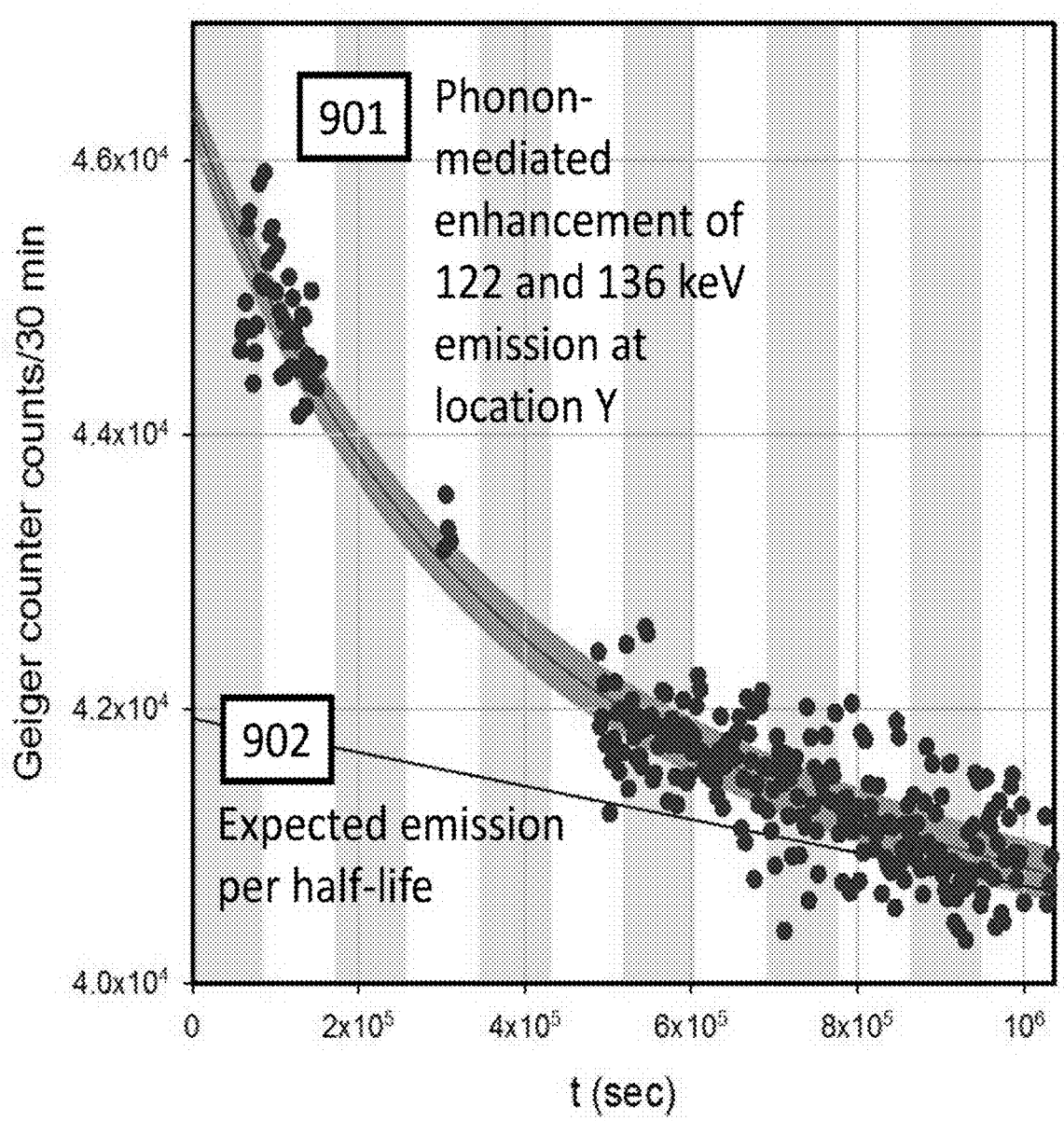
FIG. 9 shows a plot depicting phonon-mediated enhancement of emission from 122 and 136 keV nuclear energy transitions as measured with a Geiger counter for a Co-57 source.
Figure 10:
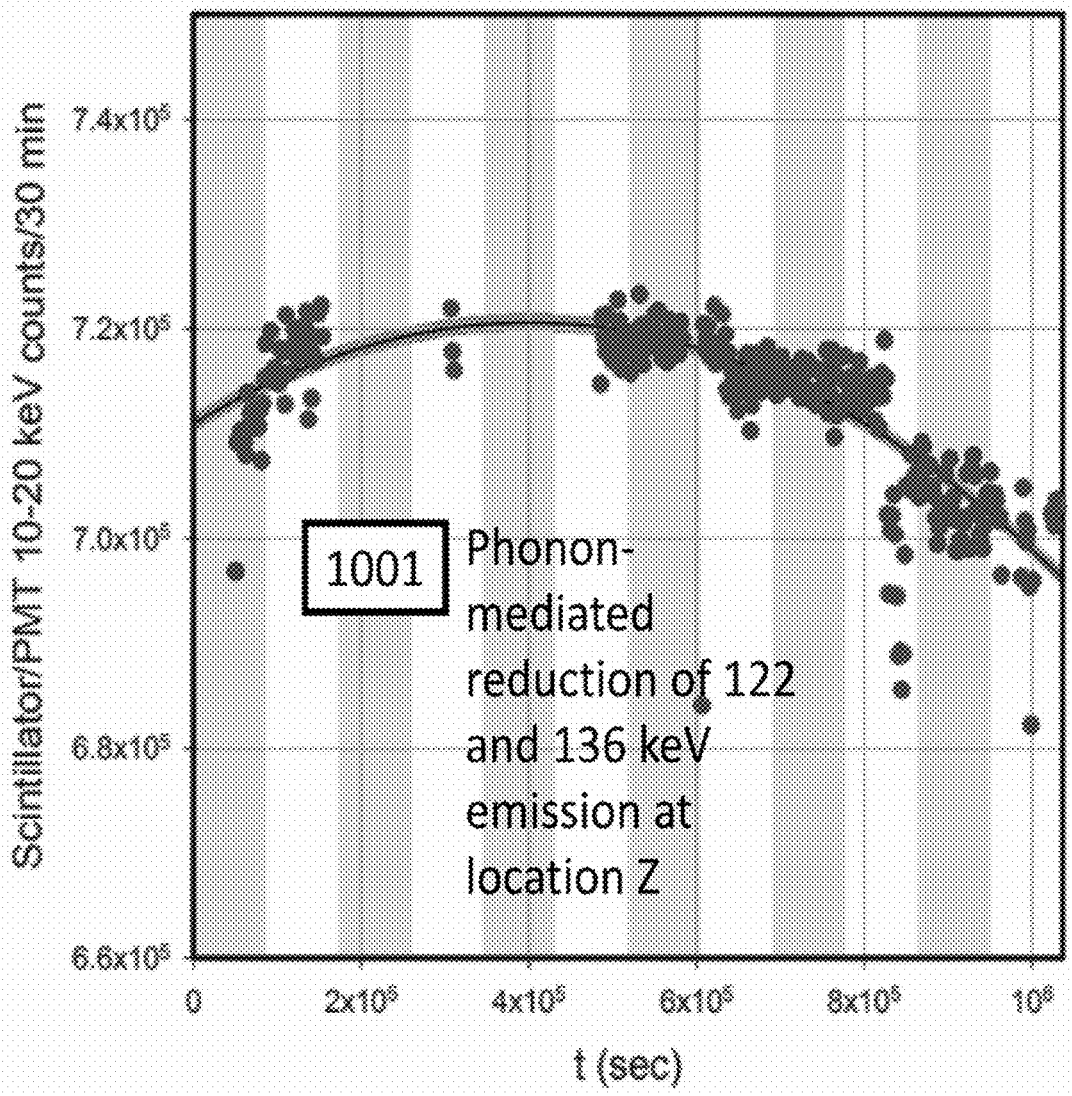
FIG. 10 shows a plot depicting phonon-mediated reduction of emission from 122 and 136 keV nuclear energy transitions as measured with a scintillation detector for a Co-57 source.
Figure 15:
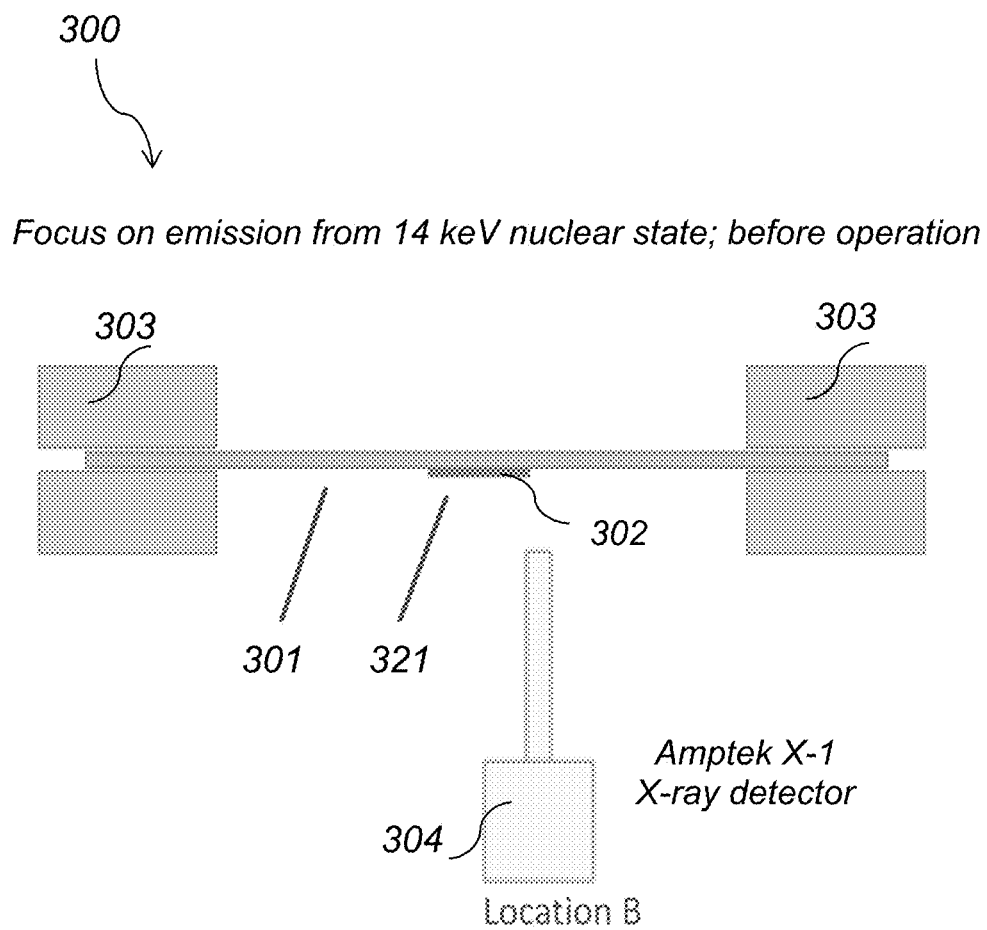
FIG. 15 illustrates an exemplary apparatus for generating phonon-mediated excitation and de-excitation of atomic nuclei (through non-resonant excitation transfer) and for measuring corresponding delocalization effects of resulting photon emission.
Figure 16:
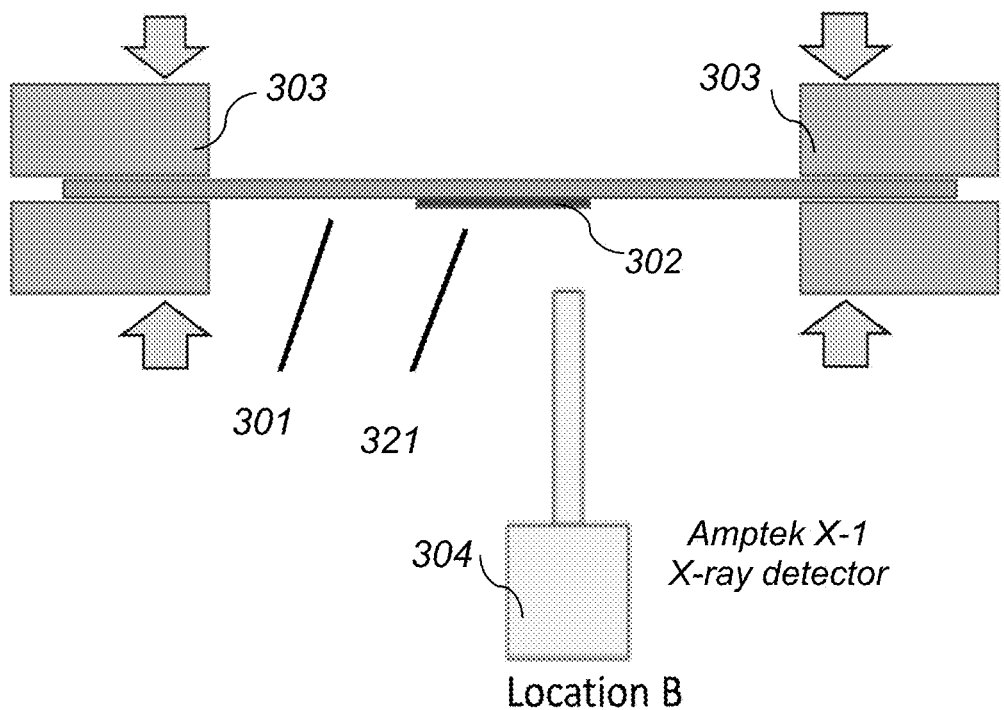
FIG. 16 illustrates the exemplary apparatus of FIG. 15 in operation.
Figure 17:
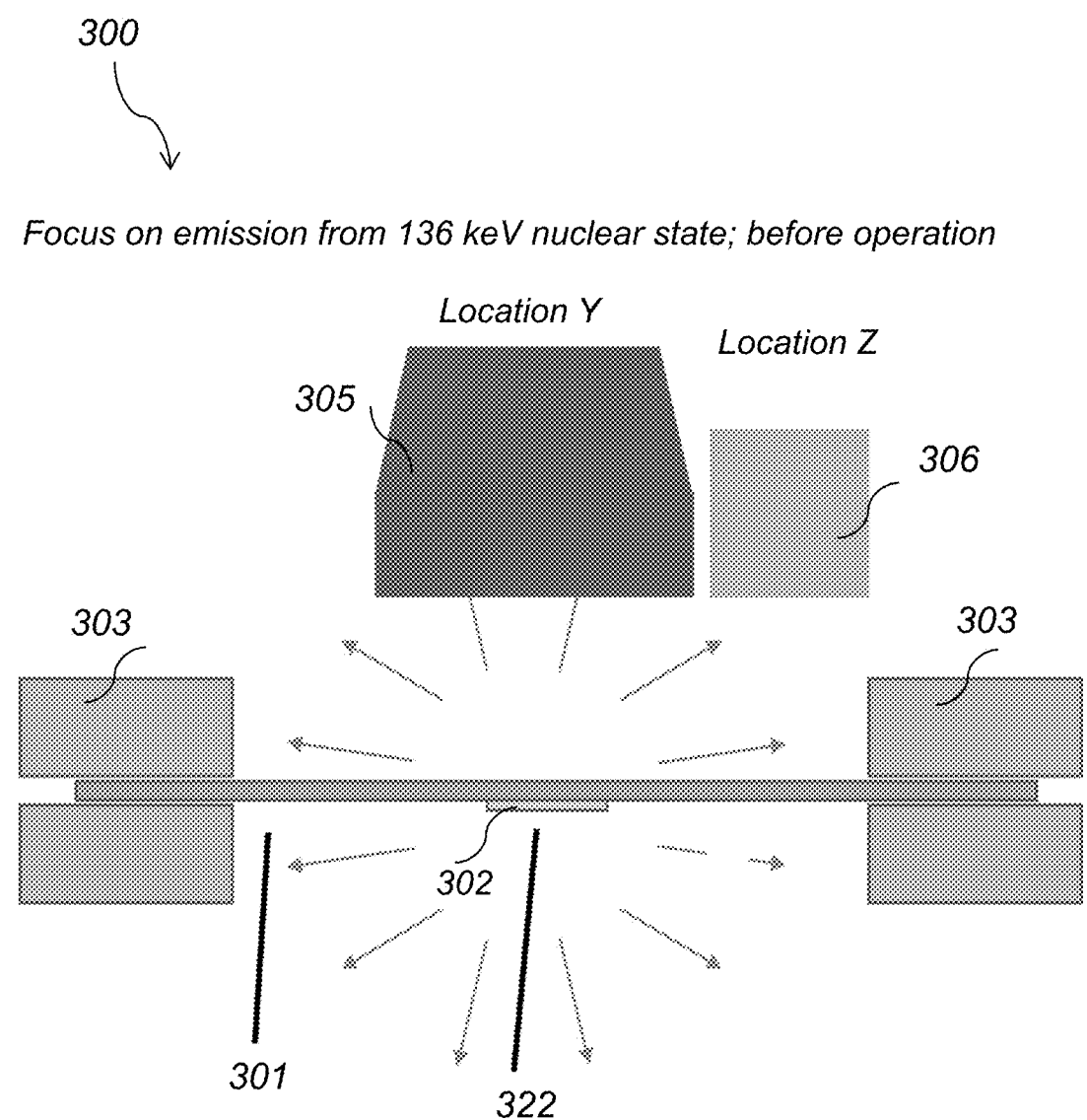
FIG. 17 illustrates an exemplary apparatus for generating phonon-mediated excitation and de-excitation of atomic nuclei (through resonant excitation transfer) and for measuring corresponding angular anisotropy effects of resulting photon emission.
Figure 18:
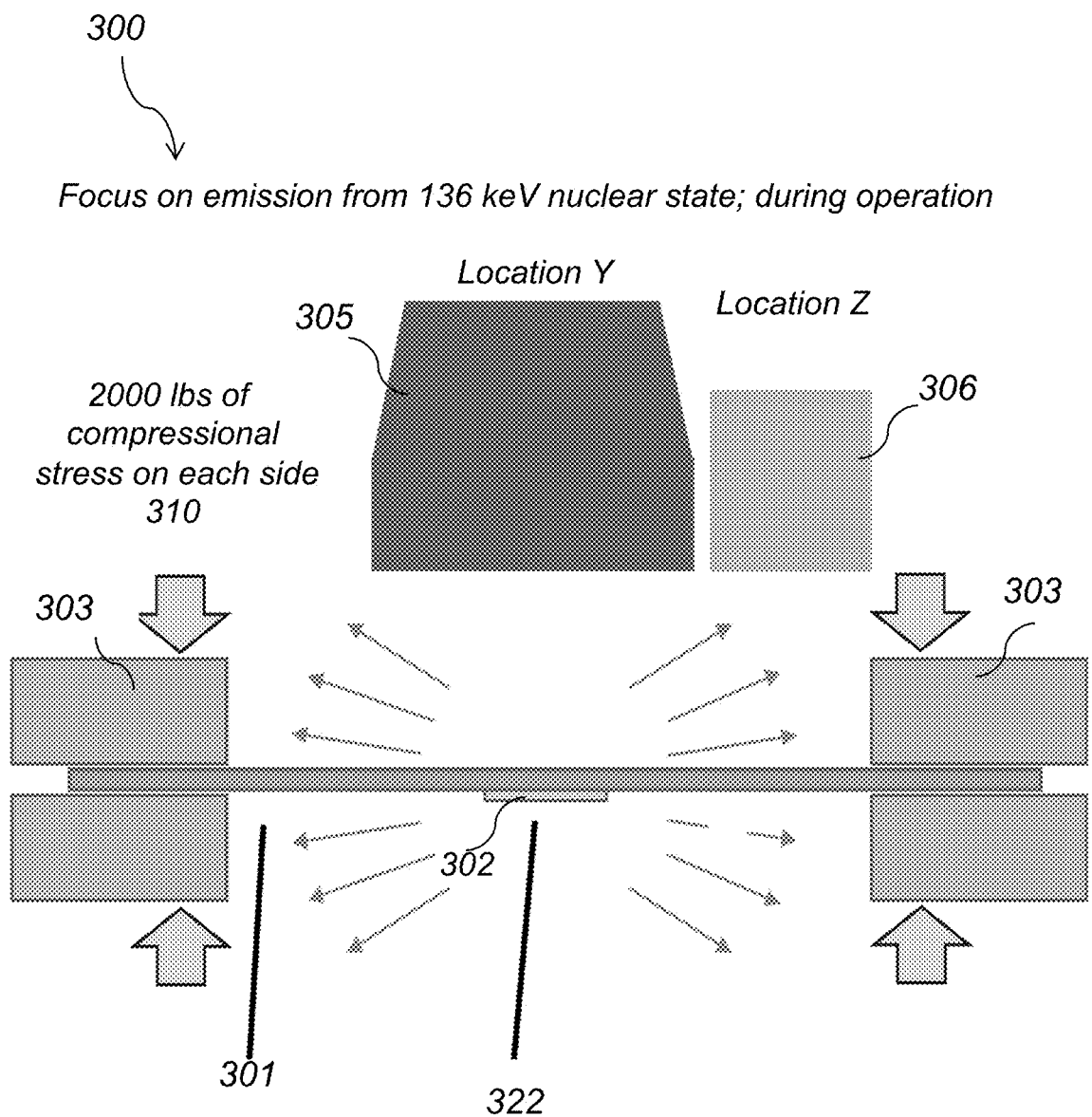
FIG. 18 illustrates the exemplary apparatus of FIG. 17 in operation.

The schematics in FIGS. 15 and 16 further illustrate the origin of the observed enhancement of 14 keV photon emission. In these two schematics, Reference 321 marks areas where nuclei emit 14 keV photons. Specifically, FIG. 15 shows the exemplary apparatus before operation. FIG. 16 shows the apparatus during operation i.e. with phonons generated from applied mechanical stress. With the presence of the phonons, some of the excitation conventionally emitted from Co-57 locations in the substrate via photons gets de-excited through phonon-mediated de-excitation and some of the nearby ground state Fe-57 nuclei get excited through phonon-mediated excitation (driven by non-resonant excitation transfer). Consequently, photon emission from areas with many potential receiver nuclei in the vicinity of many potential donor nuclei goes up under the presence of sufficiently high energies in excited phonon modes that enable phonon-mediated energy exchange. In this particular exemplary configuration, the Amptek X123 Gamma spectrometer 304 is the only detector at the bottom side of the plate 301, facing the ring-shaped sample substrate 302 directly. Since the steel plate 301 shields the detectors on the back side from 14 keV photons, the Gamma spectrometer 304 is the only detector in this exemplary setup to keep track of changes in excitation and de-excitation involving the 14 keV nuclear level of the Fe-57 nuclei. As for the detectors 305, 306 on the back side of the plate 301, being shielding from the 14 keV emission on the front side allows them to keep track specifically of changes involving the 136 keV and 122 keV transitions to lower states. Moreover, the presence of two detectors 305, 306 in two different locations on the back side provides additional spatial information regarding changes in the emission of harder Gammas. FIG. 9 shows time-dependent photon counts for harder Gammas at the GM counter 306 positioned in Location Z. During operation, the graph exhibits an enhancement of harder Gamma emission at Location Z which gradually decreases until approaching the steady and consistent decline of photon emission expected from the decay of remaining Co-57 nuclei. As described above, in such an embodiment, effects from phonon-nuclear coupling based mechanisms decrease over time as the system equilibrates mechanically, dislocation movement slows and phonon generation decreases. In contrast to the enhancement at Location Z, the detector 305 at Location Y shows a reduction of emission during operation (phonon generation), as shown in FIG. 10. The schematics in FIGS. 17 and 18 further illustrate the origin of the observed enhancement and reduction of 122 keV and 136 keV photon emission at Location Y and Location Z. FIG. 17 shows the exemplary apparatus before operation. Reference 322 marks areas where nuclei emit 122 keV and 136 keV photons from conventional de-excitation of the 136 keV energy level of Fe-57* nuclei. The photon emission in FIG. 17 is isotropic around the substrate 322. FIG. 18 shows the apparatus during operation i.e. with phonons generated from applied mechanical stress 310. With the presence of the phonons, and the manifestation of resonant excitation transfer, some of the excited Fe-57* in the sample substrate get de-excited via phonon-mediated de-excitation and some of the ground state Fe-57 nuclei get excited through phonon-mediated excitation. Consequently, nuclei excited through phonon-mediated excitation align in their nuclear orientation and when they de-excite conventionally (through radiative decay), their photons are emitted at equivalent emission angles. Macroscopically, this manifests as a change in the overall angular distribution of photon emission (enhancement in some parts of the total solid angle and reduction in other parts). As illustrated in FIG. 18, photon emission becomes concentrated at particular angles. FIGS. 17 and 18 illustrate how during operation, a change in the angular distribution of photon emission leads to the enhancement and reduction observations of the detectors at Location Z and Location Y, respectively. The described effects from operation of this particular embodiment of the apparatus and implementation of the presented method have been reproduced and confirmed numerous times, including with different detectors, different detector locations, and different samples. This embodiment, the underlying method, the observed effects and related mechanisms can therefore be considered highly reproducible and validated.

Figure 19:
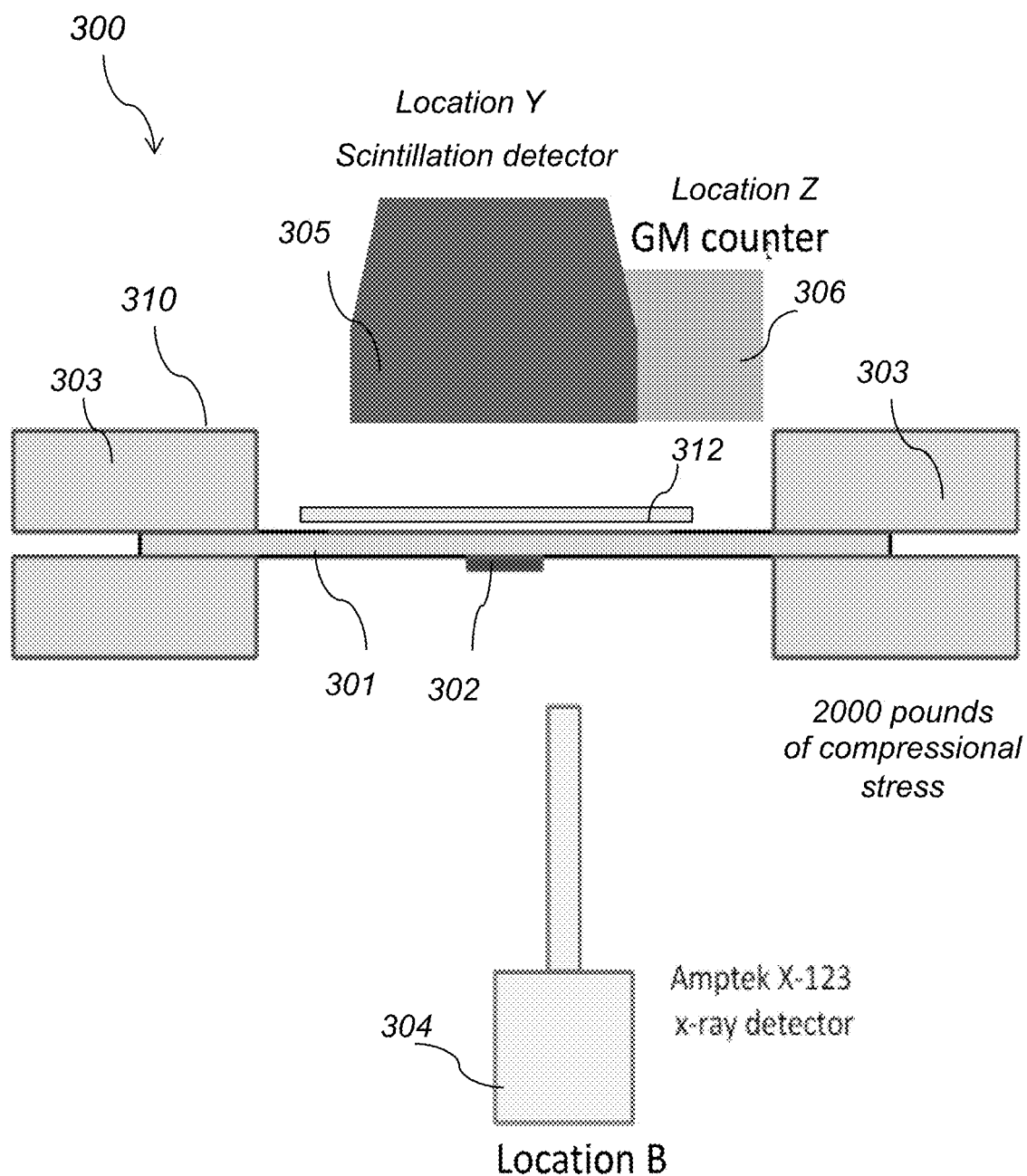
FIG. 19 depicts a side view of another embodiment of the system used to excite and de-excite atomic nuclei via phonons, according to this invention.
Figure 20:
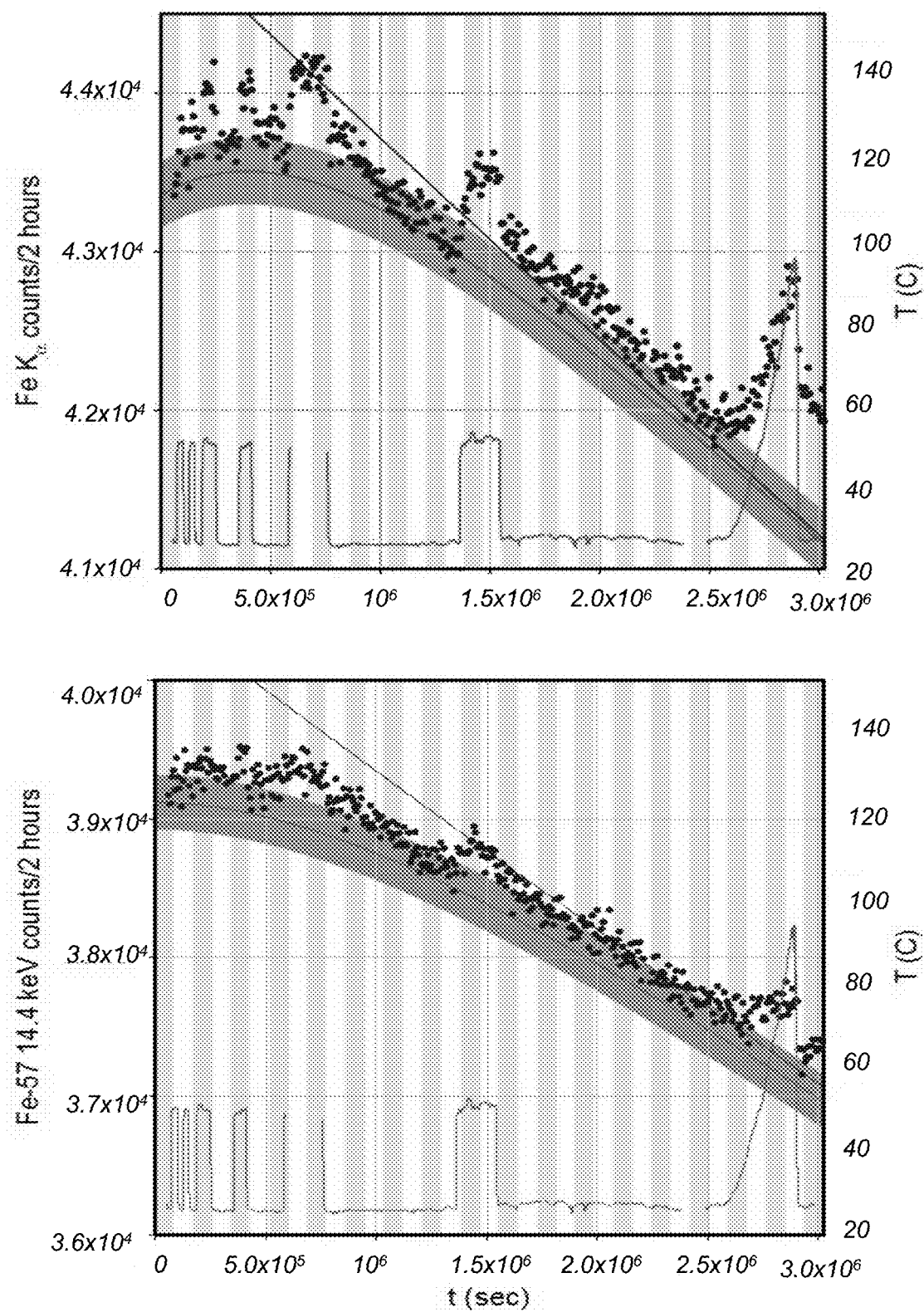
FIG. 20 depicts data taken with the system of FIG. 19.

Referring to FIG. 19, in another embodiment, the sample assembly 300 is heated while under mechanical stress from the clamps 303. A silicone rubber heating pad 312 with 50 W heating power is attached to the back of the plate and held down to keep it in place and in contact with the steel plate through two small springs at the edge of the plate. During the operation in this embodiment, mechanical stress is applied to the clamps 303 as described above. The difference now is that during the operation, the plate 301 is heated through DC heat pulses of three hours or more which temporarily leads to thermal expansion of the steel plate 301 and increase of mechanical stress as the expanding steel presses against the fixed clamps 303. In one example, the temperature increase of the steel plate is 75° C. This approach allows for in-situ measurements of the photon emission response to an increase in phonon generation (due to increased mechanical stress). In other words, the mechanical stress is increased without having to take the plate assembly away from the testing station and the detectors. FIG. 20 shows data from such an embodiment. In this embodiment, the nuclear response in the data can be more directly linked to its mechanical cause.

Figure 21:
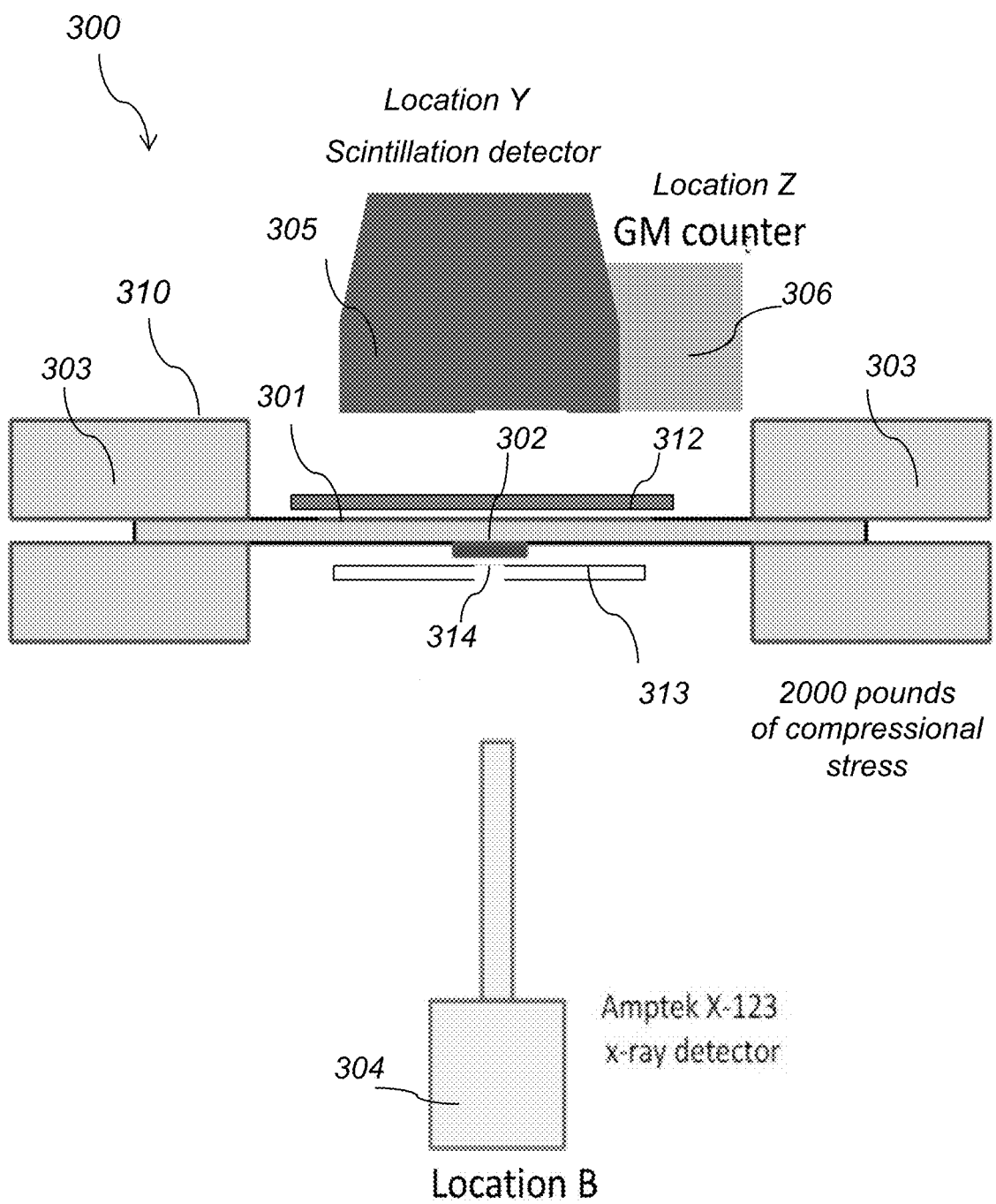
FIG. 21 depicts a side view of yet another embodiment of the system used to excite and de-excite atomic nuclei via phonons, according to this invention.
Figure 22:
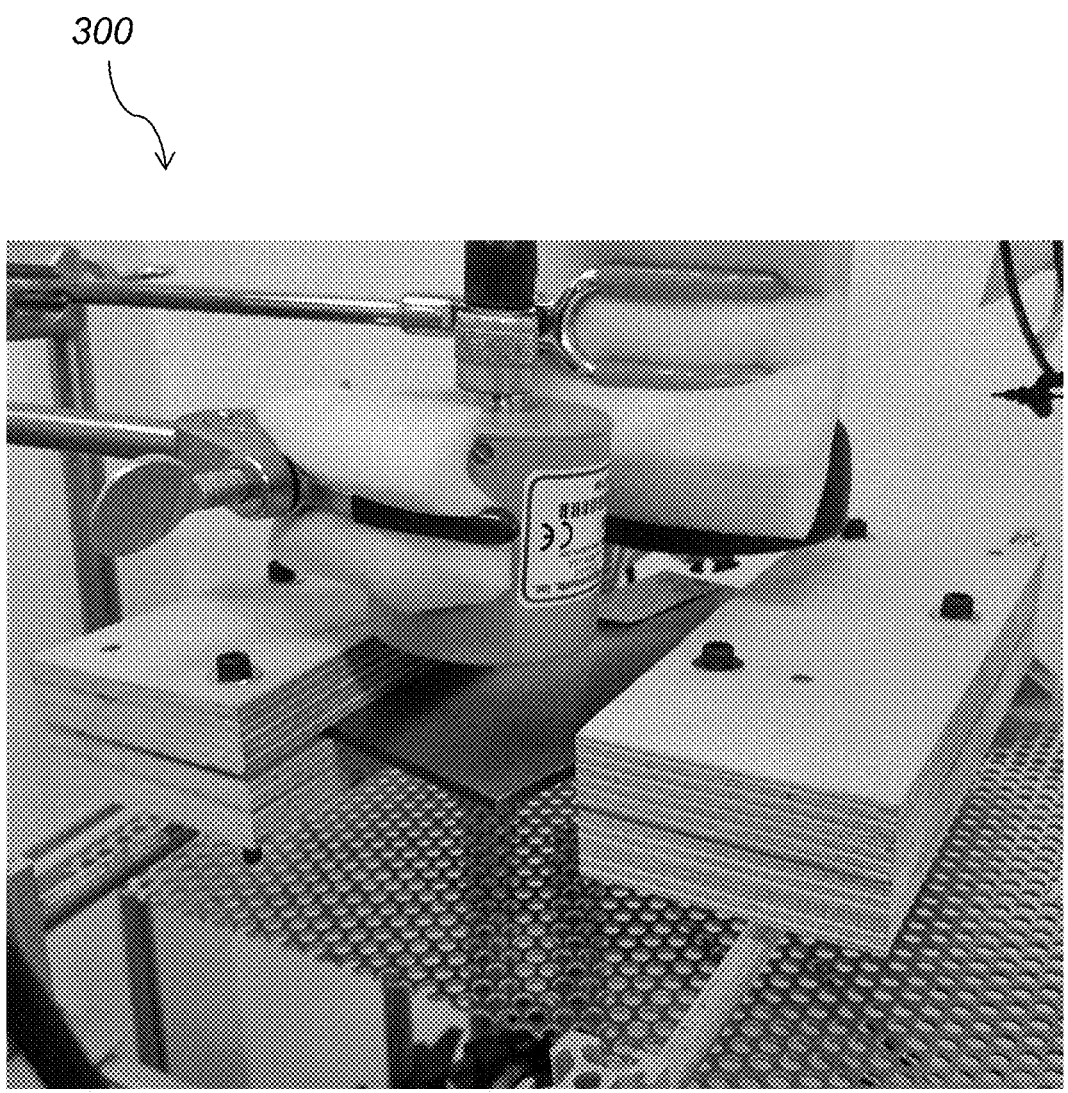
FIG. 22 depicts a picture of a side view of the embodiment of FIG. 3A.
Figure 23:
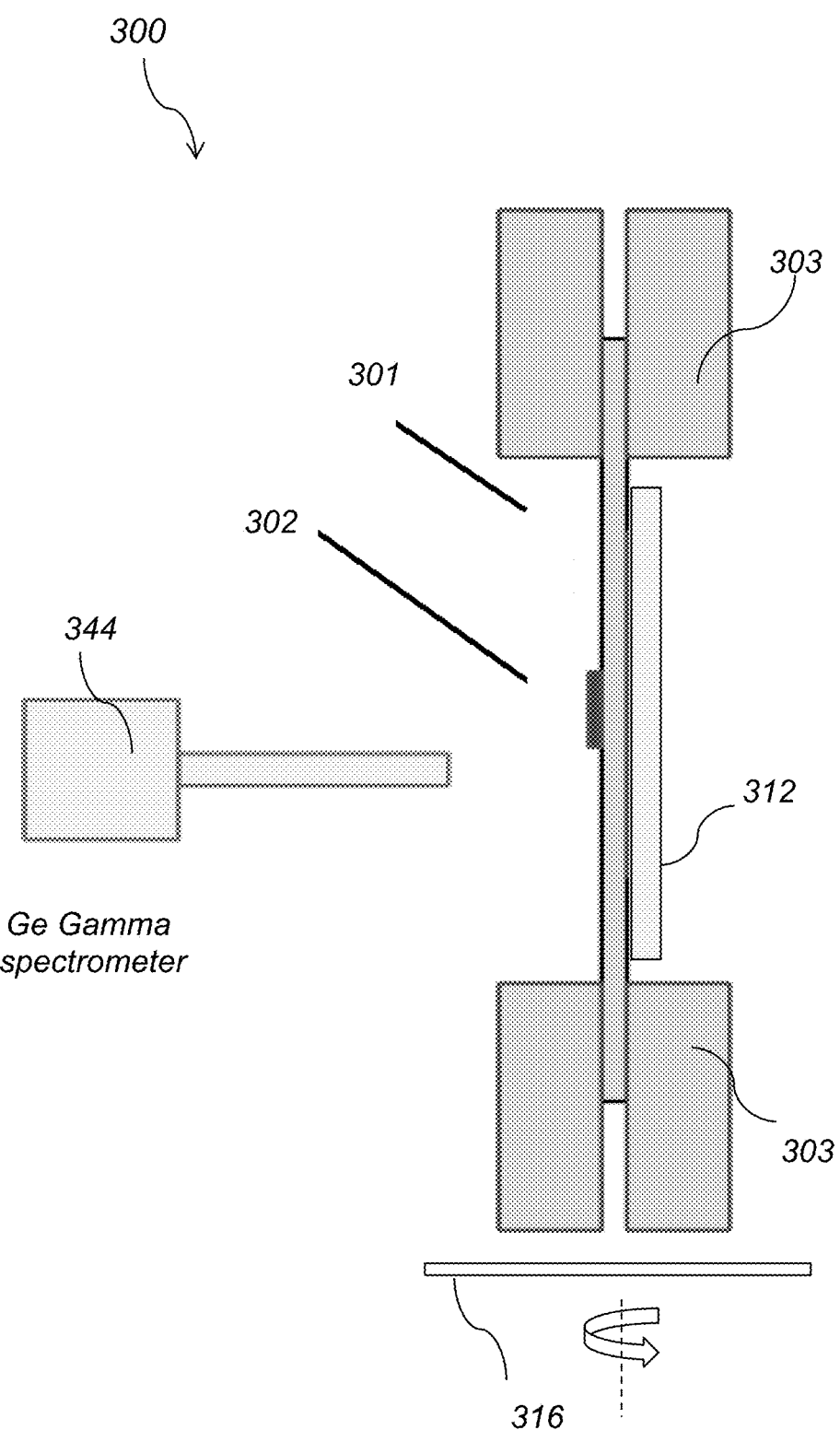
FIG. 23 depicts a side view of yet another embodiment of the system used to excite and de-excite atomic nuclei via phonons, according to this invention.

Referring to FIG. 21, in another embodiment, changes in the spatial distribution of emission can be observed further. A small aperture 314, also known as a pinhole, is used to measure photon emission and changes thereof in distinct locations on the sample. To function as an aperture 314, an aluminum plate 313 measuring 1.5"×1.5"×0.25" is placed on top of the substrate 302. The aluminum plate 313 contains a hole 314 of 1 mm diameter. A Gamma spectrometer such as the Amptek X123 is placed on top of the pinhole and records time history spectra while phonons are generated in situ via thermally-induced stress pulses, as described above. These measurements show that during phonon generation, the emission of photons from nuclei goes down in certain locations of the sample and goes up in other locations of the sample. This further exhibits delocalization and the manifestation of non-resonant excitation transfer during phonon generation.

In another embodiment, a photographic film of high sensitivity (ISO 1000 or higher) is placed in a light-tight envelope over the pinhole 314 of FIG. 21. The film used is Ilford 1200 and measures 2"×2" and is wrapped in a 3"×3" light-tight black plastic envelope (from B&H Video). The film envelope is kept at constant room temperature via a layer of insulation and thermoelectric cooling. The film is exposed for 24 hours (image A) while no heating is applied to the sample assembly i.e. before operation. During operation, a temperature increase of 20° C. is applied to the steel plate 301 in the sample assembly via the heating pads 312, causing thermally induced stress and phonon generation. A new film envelope with unexposed film of the same kind (image B) is placed in the same location above the pinhole for another 24 hours, as operation continues. Both films are developed following standard procedures from Ilford and digitized using a film scanner. The digitized images are turned into bitmaps, normalized in brightness, and geometrically overlaid. A subtraction of image A from image B shows phonon-induced changes in the distribution of nuclear emission, as described above.

In another embodiment, the sample assembly 310 is attached to a two-dimensional computer controlled stage that allows for stepwise linear positioning of the sample relative to a detector 304 and pinhole 314 at programmable and repeatable positions. In one example, two Parker 404XR linear stages with minimum step sizes of 3 μm are used in XZ configuration. The stage can then do a raster scan, moving the sample assembly relative to the detector such that 100×100 positions are scanned across on top of the substrate on the plate assembly. A 1-minute spectrum with a timestamp and location marker is taken at each point. From these data, the spatial distribution of emission can be measured for different energy levels such as the nuclear lines only. A full image is taken at a fixed level of mechanical stress (image A). Next, operation commences and mechanical stress is increased in situ (thermally through the heating pads, as described above). As a result, during operation more phonons are generated in the plate. In this state, another full scan is carried out, resulting in another full image (image B). The resulting 100×100 pixel images can be subtracted (image A from image B) to observe the spatial change in nuclear emission at different energy bands (such as the 14 keV band, the 122 keV band, and the 136 keV band).

Figure 24:
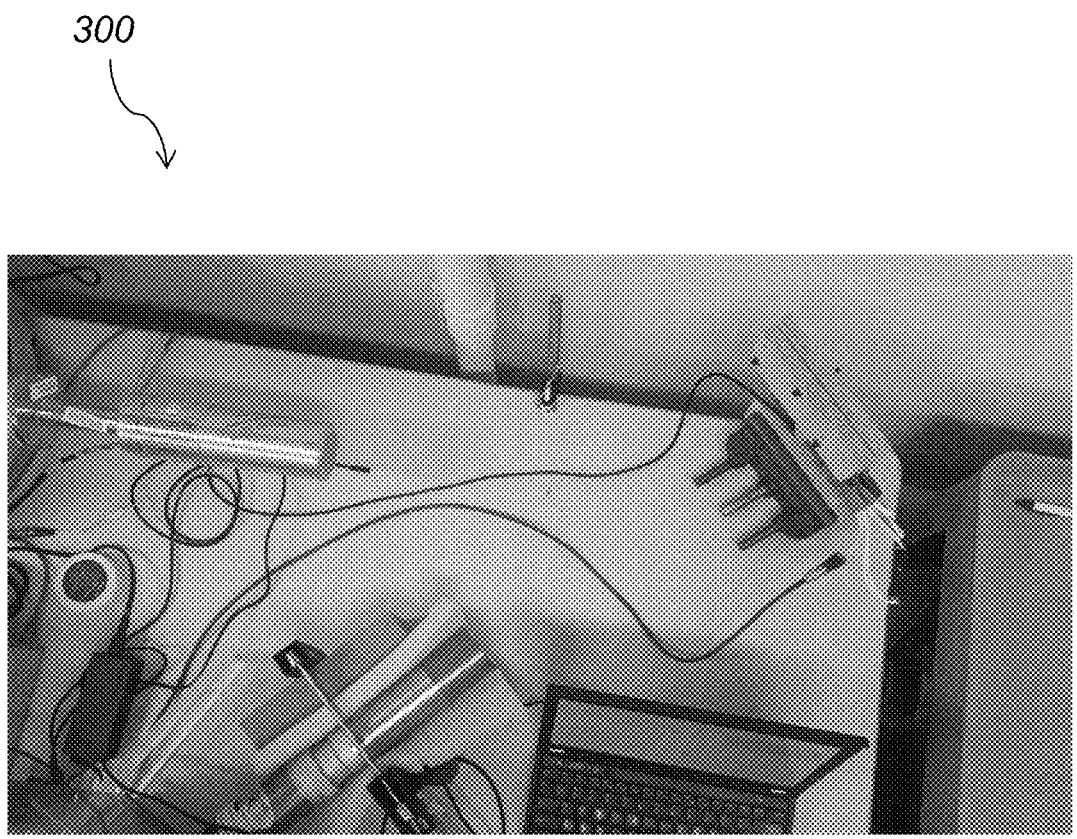
FIG. 24 depicts a picture of the embodiment of FIG. 23.

In yet another embodiment, the sample is placed on a rotational stage 316 and rotated in front of a Gamma spectrometer such as an Ortec high purity Ge Gamma spectrometer 344, as shown in FIG. 24. Rotation can be carried out manually or in a computer controlled manner. The rotational stage 316 places the sample at different angles relative to the detector 304. In one example, stage 316 places the sample at 18 different angles at equal distance covering a 180 degree angle relative to the detector. A scan is undertaken with a fixed level of mechanical stress and spectra are recorded at each angle. Then, operation commences by increasing the mechanical stress as descried above (i.e. more phonons are generated), and the scan is repeated. Comparing the angular distribution of photon emission at different photon energy bands demonstrates anisotropy and collimation effects due to phonon nuclear-coupling mechanisms.

Figure 26:
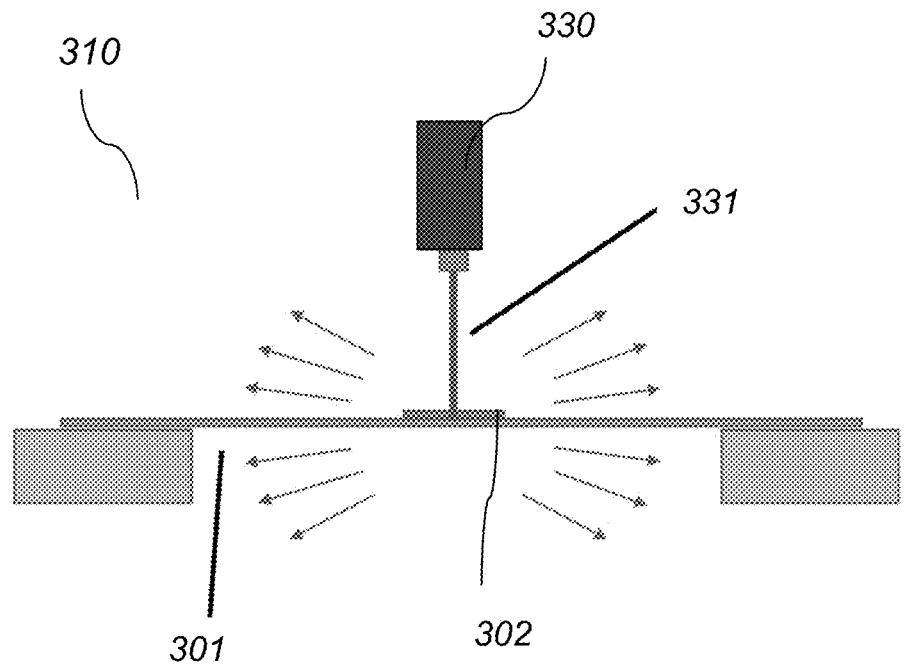
FIG. 26 depicts a side view of yet another embodiment of the system used to excite and de-excite atomic nuclei via phonons, according to this invention.
Figure 27:
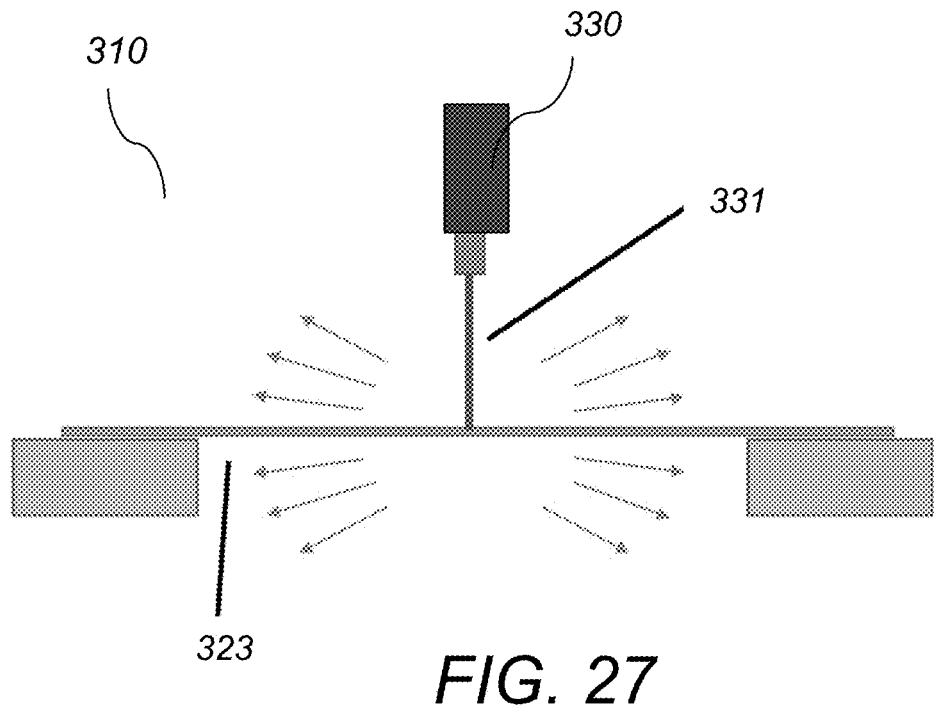
FIG. 27 depicts a side view of yet another embodiment of the system used to excite atomic nuclei via phonons, according to this invention.

In yet another embodiment, phonons are generated via laser (one of high frequency lasers in THz regime, dual laser configuration with high frequency beat frequency, or fast pulsed lasers/superfast lasers/ultrafast lasers). When using lasers to generate phonons in condensed matter materials, attention needs to be paid to the coupling between the laser light and the condensed matter materials. To this end, different surface enhancement techniques are employed. Moreover, in such a configuration another material besides steel is preferred for higher light absorption characteristics. Referring to FIG. 26, an exemplary embodiment where a laser is used to generate phonons in a condensed matter medium for the purposes of phonon-mediated energy transfer to and from atomic nuclei, includes a laser 330 directing a laser beam 331 onto the plate assembly. The plate assembly can contain a substrate 302 on top of a plate 301 such as a steel plate. Laser 330 may be a high frequency laser, dual laser configuration with high frequency beat frequency, or a superfast laser. The laser beam 331 hits the surface of the sample assembly with energetic photons and generates phonons in the condensed matter medium. The phonons can the lead to the manifestation of phonon-nuclear coupling effects as described above. The exemplary embodiment in FIG. 26 illustrates laser-induced phonon generation in the presence of a radioactive source that provides initial nuclear excited states whose energy can be transferred (such as via excitation transfer or down-conversion). Depending on the laser characteristics and their impact on the phonon-nuclear coupling strengths (determining variables discussed above), the induced phonon generation can lead to effects as the ones discussed above such as delocalization and anisotropy of emission. FIG. 27 illustrates a slightly different configuration. Here, no initial excited states are present and the laser-induced phonon generation is used for up-conversion i.e. excitation of nuclear or mixed states from ground states without corresponding de-excitation of already excited states. Again, in such a configuration, available nuclear and mixed states depend on the engineered composition and structure of the condensed matter medium 323 and their impact on phonon-nuclear coupling strengths.

Other embodiments include one or more of the following. The term "phonon generation" is used in a functional sense indicating various known processes to generate phonons i.e. quantized vibrations in condensed phases. The first embodiment employs mechanical stress from wooden clamps for this purpose. This material is readily available and the approach readily implementable. Other ways to generate phonons and other structures to carry phonons are available that are suitable for the subject matter of the disclosure.

Examples of other phonon generation techniques that can be used for the generation and enhancement of the photon emissions include, but are not limited to, lasers, electric current, transducers, diffusion of solutes in solid solutions and particle beam bombardment, Gamma irradiation, among others. Other materials for the medium that can be used include, but are not limited to, other metals than steel, semiconductor materials, as well as nonmetallic materials such as graphene, ceramics and combinations of materials. Other micro- and nanostructures that can be used include, but are not limited to, films, membranes, wires, artificial nanostructures such as superlattice structures, and nanoparticles. Other relevant variables that affect phonon populations and which can be affected by materials scientists are crystal/grain size, the types and densities of defects, and the characteristics of surfaces (e.g. enhancement through surface nano structuring/surface nano patterning etc.).

Applications of the above mentioned invention include one or more of the following. Phonons are used to excite nuclear states and/or mixed states at specific energy levels to obtain monoenergetic photon sources. Phonons are used to de-excite nuclear excited state energy such as from excited He-4, resulting macroscopically in heat instead of Gamma emission.

Phonons are used to excite mercury nuclei such as Hg-201. Resulting low energy photons, especially when collimated can be used in such applications as X-ray lithography and micromachining. Phonons are used to excite other nuclei with nuclear states below 100 keV. Resulting low energy photons, especially when collimated can be used in such applications as X-ray lithography and micromachining. Phonons are used to excite or de-excite nuclei to other states in order to allow those nuclei to decay through different decay chains. Phonons are used to excite long lived metastable states for storing energy. Phonons are used to de-excite long lived metastable states to retrieve stored energy. Phonons are used to excited nuclei into higher unstable states that lead these nuclei to fission. We call this process coherent fission, phonon-mediated nuclear fission, or short phonofission. Phonon-mediated changes in radiation response are used to measure phonon-related characteristics in condensed matter materials, such as used in sensing/sensor applications and as used for the design, development and optimization of condensed matter environments as employed in phonon-nuclear coupling based applications.

Variations of condensed matter environments and resulting phonon characteristics have been discussed with the goal to be tailored to specific application-related phonon-nuclear coupling based mechanisms and effects. In many applications, phonon-nuclear coupling based mechanisms and resulting effects are the desired outcomes (such as photons at certain energies or certain angular orientation). In other applications, phonon-nuclear coupling based mechanisms and resulting effects such as delocalization and angular anisotropy effects can be used as proxy or intermediary results, for instance as diagnostics for characterizing the underlying condensed matter environment and changes thereof. Such applications can be useful in designing, testing, and optimizing condensed matter environments in view of other phonon-nuclear coupling based applications. These applications can also be useful for characterizing condensed matter environments more generally, for instance in the case of applications that involve sensitive sensing of stress, strain, and creep/cold flow, as well as for enhancing the understanding of phonon behavior in materials, nanostructures, and devices more generally—including phonon lifetimes, energies, and scattering mechanisms.

Excitation and de-excitation of atomic nuclei is relevant to and useful in many industrial applications. In some applications, efforts are made to transfer energy to ground state nuclei in order to excite them. For example, this is the case in such applications as related to nuclear resonance fluorescence, monoenergetic photon sources, or photonuclear reactions. In other applications, the energy from nuclei that are already excited, often as the result of a preceding nuclear reaction or decay, is to be converted into more useful forms of energy such as heat or electricity. For example, this is the case in nuclear batteries and nuclear reactors.

Several embodiments of the present invention have been described. Nevertheless, it will be understood that various modifications may be made without departing from the spirit and scope of the invention. Accordingly, other embodiments are within the scope of the following claims.

What is claimed is:

1. A system for generating photon emission from atomic nuclei comprising:
    a device for generating phonons;
    a condensed matter medium comprising atomic nuclei;
    wherein the phonons interact with the atomic nuclei and affect nuclear states of some of the atomic nuclei by transferring energy to the nuclei and causing the nuclei to emit photons; and
    wherein the device for generating phonons is configured to apply stress to the condensed matter medium and comprises an elongated plate and first and second clamps attached to first and second ends of the elongated plate, respectively, and wherein the first and second clamps are configured to apply stress onto the first and second ends of the elongated plate and to cause movement of dislocations within the elongated plate; and
    wherein the condensed matter medium comprises Co-57.

2. The system of claim 1, wherein the device for generating phonons is further configured to apply heat to the condensed matter medium.

3. The system of claim 1, wherein the condensed matter medium comprises radioactive material.

4. The system of claim 1, wherein the condensed matter medium comprises a ring-shaped substrate of evaporated 57CoC12 bonded to a center of the elongated plate.

5. The system of claim 4, wherein the ring-shaped substrate is further coated with epoxy.

6. The system of claim 1, wherein the elongated plate comprises steel having a dislocation density of 10^8/cm^2 to 10^16/cm^2.

7. The system of claim 1, wherein the first and second clamps apply compressional stress of about 2000 lbs onto the first and second ends of the elongated plate.

8. The system of claim 1, wherein each clamp comprises first and second plates and wherein the first and second plates cover a top surface corner and a bottom surface corner of the elongated plate so that each area of the elongated plate covered by the two plates forms an isosceles triangle.

9. The system of claim 1, wherein the generated photon emission is monoenergetic.

10. The system of claim 1, wherein the generated photon emission is anisotropic.

11. The system of claim 1, wherein the generated photon emission is collimated.

12. The system of claim 1, wherein energy is transferred to the nuclei via up-conversion.

13. The system of claim 1, wherein energy is transferred to the nuclei via up-excitation transfer.

14. The system of claim 1, wherein energy is transferred to the nuclei via subdivision.

15. The system of claim 1, wherein the elongated plate comprises one of metals, semiconductor materials, non-metallic materials, graphene, ceramics, and combinations thereof.

16. A method for generating photon emission from atomic nuclei comprising:
    providing a device for generating phonons;
    providing a condensed matter medium comprising atomic nuclei;
    interacting the phonons with the atomic nuclei and affecting nuclear states of some of the atomic nuclei by transferring energy to the nuclei and causing the nuclei to emit photons; and
    wherein the device for generating phonons is configured to apply stress to the condensed matter medium and comprises an elongated plate and first and second clamps attached to first and second ends of the elongated plate, respectively, and wherein the first and second clamps are configured to apply stress onto the first and second ends of the elongated plate and to cause movement of dislocations within the elongated plate; and
    wherein the condensed matter medium comprises Co-57.

17. A system for suppressing photon emission from atomic nuclei comprising:
    a device for generating phonons;
    a condensed matter medium comprising atomic nuclei;
    wherein the phonons interact with the atomic nuclei and affect nuclear states of some of the atomic nuclei by transferring energy away from the atomic nuclei and causing suppression of otherwise expected photon emission from the atomic nuclei; and
    wherein the device for generating phonons is configured to apply stress to the condensed matter medium and comprises an elongated plate and first and second clamps attached to first and second ends of the elongated plate, respectively, and wherein the first and second clamps are configured to apply stress onto the first and second ends of the elongated plate and to cause movement of dislocations within the elongated plate; and
    wherein the condensed matter medium comprises Co-57.

18. A system for generating photon emission from atomic nuclei comprising:
    a device for generating phonons;
    a condensed matter medium comprising a first group of atomic nuclei and a second group of atomic nuclei;
    a first detector configured to detect photons at a first location;
    a second detector configured to detect photons at a second location;
    wherein the phonons interact with the first group of atomic nuclei and affect nuclear states of the first group of the atomic nuclei by transferring energy to the first group of atomic nuclei and causing the first group of atomic nuclei to emit photons at the first location;
    wherein the phonons interact with the second group of atomic nuclei and affect nuclear states of the second group of atomic nuclei by transferring energy away from the second group of atomic nuclei causing suppression of otherwise expected photon emission from the second group of nuclei at the second location; and
    wherein the condensed matter medium comprises Co-57; and wherein the device for generating phonons is configured to apply stress to the condensed matter medium and comprises one of a laser, a transducer or a mechanical clamping apparatus.

19. A system for generating photon emission from atomic nuclei comprising:
  a device for generating phonons;
  a condensed matter medium comprising atomic nuclei;
  wherein the phonons interact with the atomic nuclei and affect nuclear states of some of the atomic nuclei by transferring energy to the nuclei and causing the nuclei to emit photons; and
  wherein the condensed matter medium comprises a ring-shaped substrate of 57CoC12; and
  wherein the device for generating phonons is configured to apply stress to the condensed matter medium and comprises one of a laser, a transducer or a mechanical clamping apparatus.

20. The system of claim 19, wherein the ring-shaped substrate is further coated with epoxy.

* * * * *